(12) United States Patent
Wu et al.

(10) Patent No.: US 11,146,969 B2
(45) Date of Patent: Oct. 12, 2021

(54) METHOD AND DEVICE IN UE AND BASE STATION USED FOR WIRELESS COMMUNICATION

(71) Applicants: KeYing Wu, Shanghai (CN); XiaoBo Zhang, Shanghai (CN); Lin Yang, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 40 days.

(21) Appl. No.: 16/727,850

(22) Filed: Dec. 26, 2019

(65) Prior Publication Data
US 2020/0213863 A1 Jul. 2, 2020

(30) Foreign Application Priority Data
Dec. 29, 2018 (CN) .......................... 201811634904.4

(51) Int. Cl.
| | |
|---|---|
| *H04W 74/08* | (2009.01) |
| *H04W 72/12* | (2009.01) |
| *H04L 1/18* | (2006.01) |
| *H04L 5/00* | (2006.01) |
| *H04W 16/14* | (2009.01) |
| *H04W 72/04* | (2009.01) |
| *H04W 74/00* | (2009.01) |

(52) U.S. Cl.
CPC ........... *H04W 16/14* (2013.01); *H04L 1/1812* (2013.01); *H04L 5/003* (2013.01); *H04L 5/0005* (2013.01); *H04L 5/0035* (2013.01); *H04L 5/0094* (2013.01); *H04W 72/0446* (2013.01); *H04W 72/0453* (2013.01); *H04W 72/1215* (2013.01); *H04W 74/006* (2013.01); *H04W 74/0816* (2013.01)

(58) Field of Classification Search
CPC ...... H04L 5/0037; H04L 5/003; H04L 5/0035
See application file for complete search history.

(56) References Cited

U.S. PATENT DOCUMENTS

| | | | | |
|---|---|---|---|---|
| 5,864,800 A | * | 1/1999 | Imai ................. | G11B 20/00007 704/229 |
| 2014/0328314 A1 | * | 11/2014 | Palanki ................ | H04B 17/345 370/330 |

(Continued)

*Primary Examiner* — Raj Jain

(57) ABSTRACT

The present disclosure provides a method and a device in a UE and a base station used for wireless communication. A first node operates first information; and transmits a first radio signal in M1 out of M frequency sub-band(s). Herein, the first information is used for determining S candidate integers; K1 of K bit block group(s) is(are) used for generating the first radio signal, any of the K bit block group(s) comprises a positive integer number of code block(s); K is a candidate integer of the S1 candidate integer(s), M is used for determining the S1 candidate integer(s) out of the S candidate integers; the first node is a base station, the operating action is transmitting; or the first node is a UE, the operating action is receiving. The above method helps reduce the amount of data retransmitted due to LBT failure of partial frequency sub-bands.

20 Claims, 19 Drawing Sheets

(56) References Cited

U.S. PATENT DOCUMENTS

| | | | |
|---|---|---|---|
| 2016/0191175 A1* | 6/2016 | Hwang | H04B 15/00 |
| | | | 370/329 |
| 2018/0048435 A1* | 2/2018 | Islam | H04W 72/005 |
| 2019/0103942 A1* | 4/2019 | Wu | H04L 5/0048 |
| 2020/0213863 A1* | 7/2020 | Wu | H04L 5/0094 |
| 2020/0396042 A1* | 12/2020 | Zhang | H04L 5/0055 |

* cited by examiner

First signaling —used for determining→ Size of first TB

...

Type of M channel listening(s) —used for determining→ Mapping mode of first modulation symbol sequence to M frequency sub-bands

FIG.21

Third information —used for determining→ M0 frequency sub-band(s)

FIG.22

METHOD AND DEVICE IN UE AND BASE STATION USED FOR WIRELESS COMMUNICATION

CROSS-REFERENCE TO RELATED APPLICATION

This application claims the priority benefit of Chinese Patent Application Serial Number 201811634904.4, filed on Dec. 29, 2018, the full disclosure of which is incorporated herein by reference.

BACKGROUND

Technical Field

The present disclosure relates to methods and devices in wireless communication systems, and in particular to a method and a device in a wireless communication system that supports data transmission on Unlicensed Spectrum.

Related Art

In conventional 3rd Generation Partner Project (3GPP) Long-term Evolution (LTE) system, data transmission only occurs on Licensed Spectrum, however, as application scenarios diversify and service requests increase rapidly, the Licensed Spectrum may hardly meet the needs for traffic. To address such difficulties, Unlicensed Spectrum communication is introduced into LTE Release 13 and Release 14. A study item (SI) of the access of Unlicensed Spectrum under New Radio (NR) was approved at the 3GPP Radio Access Network (RAN) #75 Plenary Session, and later at the 3GPP RAN #78 Plenary Session, it was decided that the access of Unlicensed Spectrum will be supported in NR Release 15.

In the item of License Assisted Access (LTE LAA), a transmitter (i.e., a base station or a User Equipment) first needs to perform Listen Before Talk (LBT) before transmitting data on Unlicensed Spectrum so as to ensure that other ongoing wireless communications are not disturbed. According to discussions at the 3GPP RAN1 #92bis conference, LBT is measured by 20 MHz in the NR-Unlicensed spectrum (NR-U) system.

In NR Release 15, transmissions based on Code Block Group (CBG) is supported. A CBG comprises a positive integer number of Code Block(s) (CB(s)), and all these CBs in the CBG will be retransmitted or assumed to be received correctly as a whole.

SUMMARY

The inventors have found through researches that a broadband NR-U system may include a positive integer number of 20 MHz frequency sub-bands. When LBT is performed with a unit of 20 MHz, it is likely that only part of frequency sub-bands can be used for transmitting a radio signal. To reduce the amount of data retransmitted due to failed LBT of partial frequency sub-bands, the mapping of CBGs has to correspond to frequency sub-bands, so that each CBG will be mapped into one frequency sub-band.

In view of the above problem, the present disclosure provides a solution. It should be noted that the embodiments of a User Equipment (UE) in the present disclosure and the characteristics in the embodiments may be applied to a base station if no conflict is incurred, and vice versa. And the embodiments of the present disclosure and the characteristics in the embodiments may be mutually combined if no conflict is incurred.

The present disclosure provides a method in a first node for wireless communication, comprising:
operating first information; and
transmitting a first radio signal in M1 of M frequency sub-band(s);
herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the first node is a base station, the operating is transmitting; or the first node is a UE, the operating is receiving.

In one embodiment, the present disclosure needs to figure out how to ensure that a CBG is mapped into a frequency sub-band. The above method solves the problem by associating the number of CBGs with the number of frequency sub-bands.

In one embodiment, the above method is characterized in that the K bit block group(s) is(are) K CBG(s), the K is set as a positive integral multiple of the M, thus enabling a CBG to be mapped into a frequency sub-band.

In one embodiment, an advantage of the above method is that the amount of data retransmitted caused by LBT failure of part of frequency sub-bands can be reduced.

According to one aspect of the present disclosure, comprising:
operating a first signaling;
herein, a first transport block (TB) is used for generating the K bit block group(s), the first signaling is used for determining a size of the first TB; the first node is a base station, the operating is transmitting; or the first node is a UE, the operating is receiving.

According to one aspect of the present disclosure, comprising:
receiving second information;
herein, the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

According to one aspect of the present disclosure, comprising:
transmitting a second radio signal;
herein, K2 of the K bit block group(s) is(are) used for generating the second radio signal, the K2 is a positive integer no greater than the K; the first radio signal and the second radio signal belong to a same HARQ process.

According to one aspect of the present disclosure, wherein the K bit block group(s) is(are) used for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set.

According to one aspect of the present disclosure, wherein the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

In one embodiment, the above method ensures that a CBG is completely mapped into a frequency sub-band, thereby decreasing the total data amount in a retransmission caused by LBT failure in some frequency sub-bands.

According to one aspect of the present disclosure, comprising:
performing M channel listening(s) respectively in the M frequency sub-band(s);
herein, the M channel listening(s) is(are) used for determining that the first radio signal can be transmitted in the M1 of the M frequency sub-band(s).

According to one aspect of the present disclosure, comprising:
operating fourth information;
herein, the fourth information is used for determining a type of the M channel listening(s); the K bit block group(s) is(are) used for generating a first modulation symbol sequence, the type of the M channel listening(s) is used for determining a mapping mode of the first modulation symbol sequence into the M frequency sub-band(s); the first node is a base station, the operating is transmitting; or the first node is a UE, the operating is receiving.

According to one aspect of the present disclosure, comprising:
operating third information;
herein, the third information is used for determining M0 frequency sub-band(s), any of the M frequency sub-band(s) is one of the M0 frequency sub-band(s); the M0 is a positive integer no less than the M; the first node is a base station, the operating is transmitting; or the first node is a UE, the operating is receiving.

The present disclosure provides a method in a second node for wireless communication, comprising:
processing first information;
receiving a first radio signal in M1 of M frequency sub-band(s);
herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the second node is a base station, the processing is transmitting; or the second node is a UE, the processing is receiving.

According to one aspect of the present disclosure, comprising:
processing a first signaling;
herein, a first TB is used for generating the K bit block group(s), the first signaling is used for determining a size of the first TB; the second node is a base station, the processing is transmitting; or the second node is a UE, the processing is receiving.

According to one aspect of the present disclosure, comprising:
transmitting second information;
herein, the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

According to one aspect of the present disclosure, comprising:
receiving a second radio signal;
herein, K2 of the K bit block group(s) is(are) used for generating the second radio signal, the K2 is a positive integer no greater than the K; the first radio signal and the second radio signal belong to a same HARQ process.

According to one aspect of the present disclosure, wherein the K bit block group(s) is(are) used for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set.

According to one aspect of the present disclosure, wherein the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

According to one aspect of the present disclosure, comprising:
monitoring the first radio signal in the M frequency sub-band(s) respectively;
herein, the first radio signal is received in the M1 frequency sub-band(s).

According to one aspect of the present disclosure, comprising:
processing fourth information;
herein, the fourth information is used for determining a type of M channel listening(s); the M channel listening(s) is(are) respectively applied to the M frequency sub-band(s), the M channel listening(s) is(are) used for determining that the first radio signal can be transmitted in the M1 of the M frequency sub-band(s); the K bit block group(s) is(are) used for generating a first modulation symbol sequence, the type of the M channel listening(s) is used for determining a mapping mode of the first modulation symbol sequence into the M frequency sub-band(s); the second node is a base station, the processing is transmitting; or the second node is a UE, the processing is receiving.

According to one aspect of the present disclosure, comprising:

processing third information;

herein, the third information is used for determining M0 frequency sub-band(s), any of the M frequency sub-band(s) is one of the M0 frequency sub-band(s); the M0 is a positive integer no less than the M; the second node is a base station, the processing is transmitting; or the second node is a UE, the processing is receiving.

The present disclosure provides a device in a first node for wireless communication, comprising:

a first processor, operating first information; and a first transmitter, transmitting a first radio signal in M1 of M frequency sub-band(s);

herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the first node is a base station, the operating is transmitting; or the first node is a UE, the operating is receiving.

The present disclosure provides a device in a second node for wireless communication, comprising:

a second processor, processing first information; and a first receiver, receiving a first radio signal in M1 of M frequency sub-band(s);

herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the second node is a base station, the processing is transmitting; or the second node is a UE, the processing is receiving.

In one embodiment, the present disclosure has the following advantages compared with conventional schemes:

reducing the amount of data retransmitted caused by LBT failure of some of frequency sub-bands and thereby improving the transmission efficiency and spectrum utilization ratio.

BRIEF DESCRIPTION OF THE DRAWINGS

Other features, objects and advantages of the present disclosure will become more apparent from the detailed description of non-restrictive embodiments taken in conjunction with the following drawings:

FIG. 21 illustrates a schematic diagram of a type of M channel listening(s) being used for determining a mapping mode of the first modulation symbol sequence into the M frequency sub-band(s) according to one embodiment of the present disclosure;

FIG. 22 illustrates a schematic diagram of third information being used for determining M0 frequency sub-band(s) according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
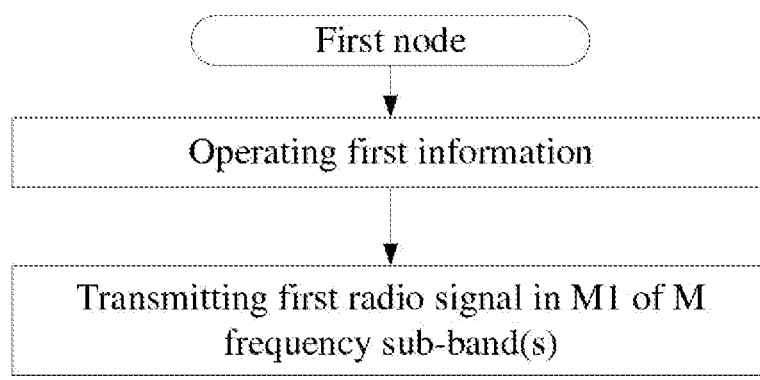
FIG. 1 illustrates a flowchart of first information and a first radio signal according to one embodiment of the present disclosure.

Embodiment 1 illustrates a flowchart of first information and a first radio signal; as shown in FIG. 1.

In Embodiment 1, the first node in the present disclosure operated first information; transmits a first radio signal in M1 of M frequency sub-band(s). Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the first node is a base station, the operating action is transmitting; or the first node is a UE, the operating action is receiving.

In one embodiment, the first information is carried by a higher layer signaling.

In one embodiment, the first information is carried by a Radio Resource Control (RRC) signaling.

In one embodiment, the first information is carried by a Medium Access Control layer Control Element (MAC CE) signaling.

In one embodiment, the first information includes part of or all information in a PDSCH-ServingCellConfig Information Element (IE).

In one embodiment, the first information includes part of or all information in a maxCodeBlockGroupsPerTransportBlock field of a PDSCH-ServingCellConfig IE.

In one embodiment, for the specific meaning of the PDSCH-ServingCellConfig IE, refer to 3GPP TS38.331.

In one embodiment, for the specific meaning of the maxCodeBlockGroupsPerTransportBlock field, refer to 3GPP TS38.331.

In one embodiment, the first information is transmitted in a positive integer number of frequency sub-band(s) out of the M frequency sub-band(s).

In one embodiment, the first information is transmitted in frequency sub-band(s) other than the M frequency sub-band(s).

In one embodiment, the first information is transmitted in a frequency band deployed on Unlicensed Spectrum.

In one embodiment, the first information is transmitted in a frequency band deployed on Licensed Spectrum.

In one embodiment, the M is greater than 1.

In one embodiment, the M is equal to 1.

In one embodiment, the M1 is equal to the M.

In one embodiment, the M1 is less than the M.

In one embodiment, the M1 is less than the M, the first node transmits the first radio signal only in the M1 of the M frequency sub-bands.

In one embodiment, the M1 is less than the M, the first node drops transmitting a radio signal in any of the M frequency sub-bands other than the M1 frequency sub-band(s).

In one embodiment, the first information indicates the S candidate integers.

In one embodiment, the first information explicitly indicates the S candidate integers.

In one embodiment, the first information implicitly indicates the S candidate integers.

In one embodiment, the first information indicates a greatest candidate integer out of the S candidate integers.

In one embodiment, the first information explicitly indicates a greatest candidate integer out of the S candidate integers.

In one embodiment, the S is greater than 1.

In one embodiment, any of the S candidate integers is a positive integer.

In one embodiment, the S candidate integers are 1, 2, . . . , P, wherein the P is the greatest candidate integer of the S candidate integers, the P is a positive integer greater than 1.

In one subembodiment, the first information indicates the P.

In one embodiment, a greatest candidate integer of the S candidate integers is configured by the maxCodeBlockGroupsPerTransportBlock field of a PDSCH-ServingCellConfig IE.

In one embodiment, the S1 is equal to the S.

In one embodiment, the S1 is less than the S.

In one embodiment, the S1 candidate integer(s) is(are) a subset of the S candidate integers.

In one embodiment, the phrase that the M is used for determining the S1 candidate integer(s) out of the S candidate integers includes the fact that the S1 candidate integer(s) includes(include) all candidate integer(s) being positive integral multiple of the M out of the S candidate integers.

In one embodiment, the phrase that the M is used for determining the S1 candidate integer(s) out of the S candidate integers includes the fact that the S1 candidate integer(s) consists(consist) of all candidate integer(s) being positive integral multiple of the M out of the S candidate integers.

In one embodiment, the phrase that the M is used for determining the S1 candidate integer(s) out of the S candidate integers includes the fact that the S1 candidate integer(s) includes(include) all positive integer(s) no greater than the greatest candidate integer of the S candidate integers and being positive integral multiple of the M.

In one embodiment, any of the S1 candidate integer(s) is a positive integral multiple of the M.

In one embodiment, the S1 candidate integers include 1, 2, . . . , and M.

In one embodiment, the S1 candidate integers include 1, 2, . . . , M, 2×M, . . . , and A×M; the A is a positive integer, and the A×M is not greater than a greatest candidate integer of the S candidate integers.

In one embodiment, any of the K bit block group(s) comprises a positive integer number of bit block(s), any of the positive integer number of bit block(s) comprises a positive integer number of bits.

In one subembodiment of the above embodiment, any of the positive integer number of bit block(s) is a code block.

In one embodiment, any of the positive integer number of code block(s) comprises a positive integer number of bits.

In one embodiment, for the specific meaning of the code block, refer to 3GPP TS38.212, section 6.2 and section 7.2.

In one embodiment, any two code blocks of all code blocks comprised in the K bit block group(s) respectively correspond to separate channel coding.

In one embodiment, any two of the positive integer number of code blocks respectively correspond to separate channel coding.

In one embodiment, all code blocks comprised in the K bit block group(s) correspond to channel coding based on a Low density parity check (LDPC) code.

In one embodiment, all code blocks comprised in the K bit block group(s) correspond to channel coding based on LDPC code base graph 1.

In one embodiment, all code blocks comprised in the K bit block group(s) correspond to channel coding based on LDPC code base graph 2.

In one embodiment, at least two code blocks of all code blocks comprised in the K bit block group(s) correspond to Rate Matching with different outputted bit numbers.

In one embodiment, all code blocks comprised in the K bit block group(s) correspond to Rate Matching with a same outputted bit number.

In one embodiment, all bits of any code block comprised in any of the K bit block group(s) are sequentially arranged.

In one embodiment, the K bit block group(s) is(are) K CBG(s) respectively.

In one embodiment, for the specific meaning of the CBG, refer to 3GPP TS38.214, section 6.

In one embodiment, any two of the K bit block groups comprise equal numbers of code blocks.

In one embodiment, at least two of the K bit block groups comprise unequal numbers of code blocks.

In one embodiment, a total number of code blocks comprised in the K bit block group(s) is a positive integral multiple of the M.

In one embodiment, a total number of code blocks comprised in the K bit block group(s) is less than the M.

In one embodiment, the K bit block group(s) is(are) generated by a same TB.

In one embodiment, all code blocks comprised in the K bit block group(s) are generated by a same TB.

In one embodiment, the K is greater than 1.

In one embodiment, the K is equal to 1.

In one embodiment, the K is a positive integral multiple of the M.

In one embodiment, the K is less than the M.

In one embodiment, the first node determines the K out of the S1 candidate integer(s).

In one embodiment, the first node assumes that the K could only be one of the S1 candidate integer(s).

In one embodiment, the first node assumes that the occasion when K is one of the S candidate integers other than the S1 candidate integer(s) is false.

In one embodiment, the K is a greatest candidate integer no greater than T of the S1 candidate integers, the T is the number of code blocks comprised in the K bit block group(s).

In one embodiment, the K1 is less than the K.

In one embodiment, the K1 is equal to the K.

In one embodiment, the K1 is less than the K, among the K bit block groups only the K1 bit block group(s) is(are) used for generating the first radio signal.

In one embodiment, the K1 is less than the K, the first radio signal is unrelated to any of the K bit block groups other than the K1 bit block group(s).

In one embodiment, the M1 is equal to the M, the K1 is equal to the K.

In one embodiment, the M1 is less than the M, the K1 is less than the K.

In one embodiment, the M1 is less than the M, the K1 is equal to the K.

In one embodiment, the M1 is used for determining the K1.

In one embodiment, the K1 is related to the M1.

In one embodiment, the K1 bit block group(s) is(are) related to the M1 frequency sub-band(s).

In one embodiment, a position(s) of the K1 bit block group(s) in the K bit block group(s) is(are) related to a position(s) of the M1 frequency sub-band(s) in the M frequency sub-band(s).

In one embodiment, the M1 frequency sub-band(s) is(are) used for determining the K1 bit block group(s) out of the K bit block group(s).

In one embodiment, a position(s) of the M1 frequency sub-band(s) in the M frequency sub-band(s) is(are) used for determining the K1 bit block group(s) out of the K bit block group(s).

In one embodiment, all bits comprised in the K bit block group(s) are used for generating B1 modulation symbol(s), the B1 modulation symbol(s) is(are) respectively mapped into B1 Resource Element(s) (RE); among RE(s) mapped by the B1 modulation symbol(s) only RE(s) mapped by B2 modulation symbol(s) is(are) located within the M1 frequency sub-band(s) in frequency domain; the first radio signal is generated by merely the B2 of the B1 modulation symbol(s); the B2 is a positive integer, the B1 is a positive integer no less than the B2.

In one embodiment, all bits comprised in the K bit block group(s) are used for generating B1 modulation symbol(s), the B1 modulation symbol(s) is(are) respectively mapped into B1 RE(s); among RE(s) mapped by the B1 modulation symbol(s) only RE(s) mapped by B2 modulation symbol(s) is(are) located within the M1 frequency sub-band(s) in frequency domain; the K1 bit block group(s) is(are) bit block group(s) of the K bit block group(s) used for generating the B2 modulation symbol(s), the B2 is a positive integer, the B1 is a positive integer no less than the B2.

In one subembodiment, all bits in any of the K1 bit block group(s) are used for generating the B2 modulation symbol(s), bits in any of the K bit block groups not belonging to the K1 bit block group(s) are unrelated to the B2 modulation symbol(s).

Embodiment 2

Figure 2:
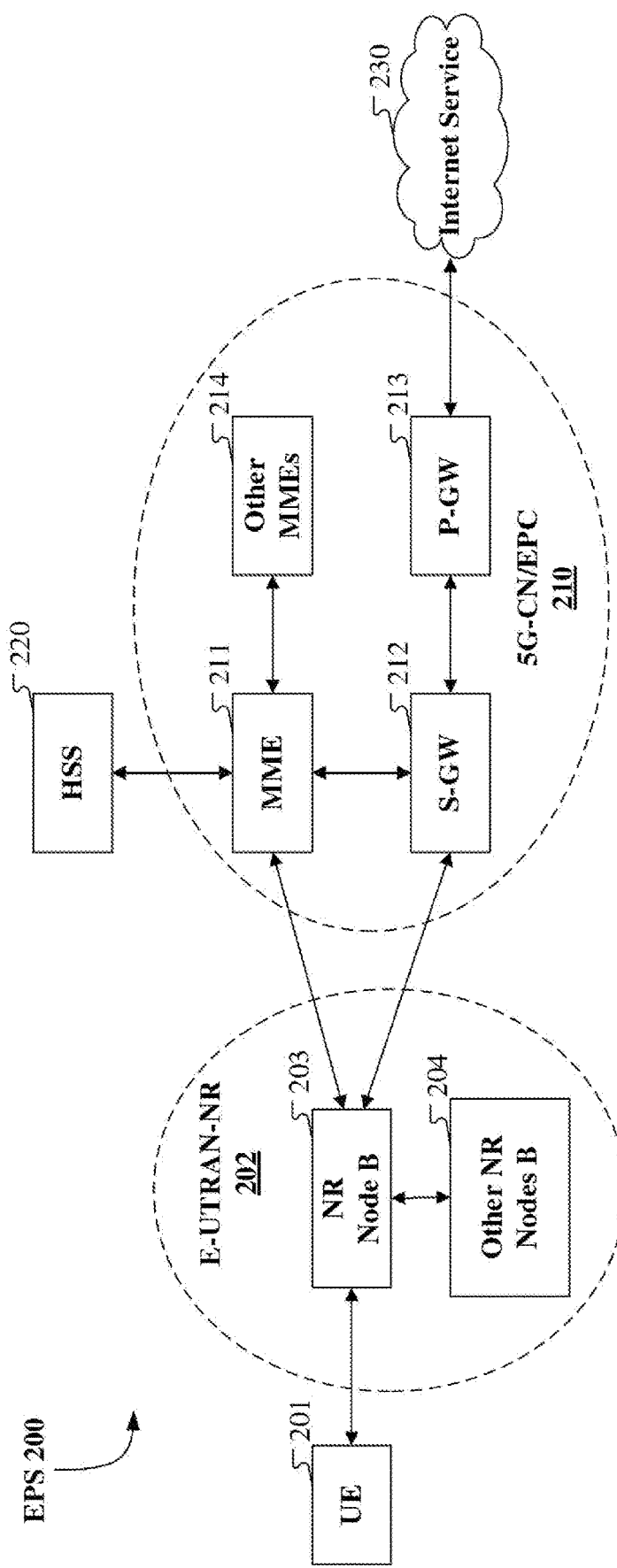
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A or 5G network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MME) 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSS).

In one embodiment, the UE 201 corresponds to the first node in the present disclosure, the gNB203 corresponds to the second node in the present disclosure.

In one embodiment, the gNB203 corresponds to the first node in the present disclosure, the UE 201 corresponds to the second node in the present disclosure.

In one embodiment, the gNB203 supports data transmission on Unlicensed Spectrum.

In one embodiment, the UE 201 supports data transmission on Unlicensed Spectrum.

Embodiment 3

Figure 3:
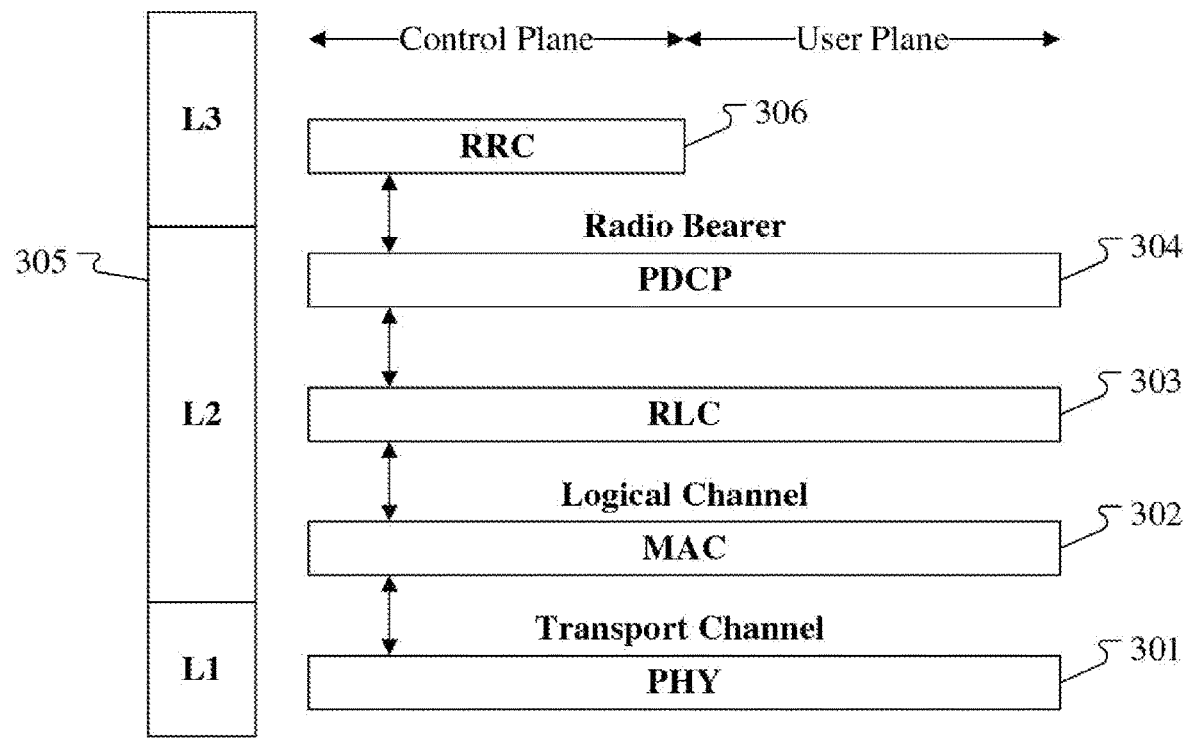
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane, as shown in FIG. 3.

FIG. 3 is a schematic diagram illustrating an embodiment of a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. Layers above the L1 are higher layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the first radio signal in the present disclosure is generated by the PHY 301.

In one embodiment, the first signaling in the present disclosure is generated by the PHY 301.

In one embodiment, the second information in the present disclosure is generated by the PHY301.

In one embodiment, the second radio signal in the present disclosure is generated by the PHY301.

In one embodiment, the fourth information in the present disclosure is generated by the RRC sublayer 306.

In one embodiment, the fourth information in the present disclosure is generated by the MAC sublayer 302.

In one embodiment, the fourth information in the present disclosure is generated by the PHY 301.

In one embodiment, the third information in the present disclosure is generated by the RRC sublayer 306.

In one embodiment, the third information in the present disclosure is generated by the MAC sublayer 302.

Embodiment 4

Figure 4:
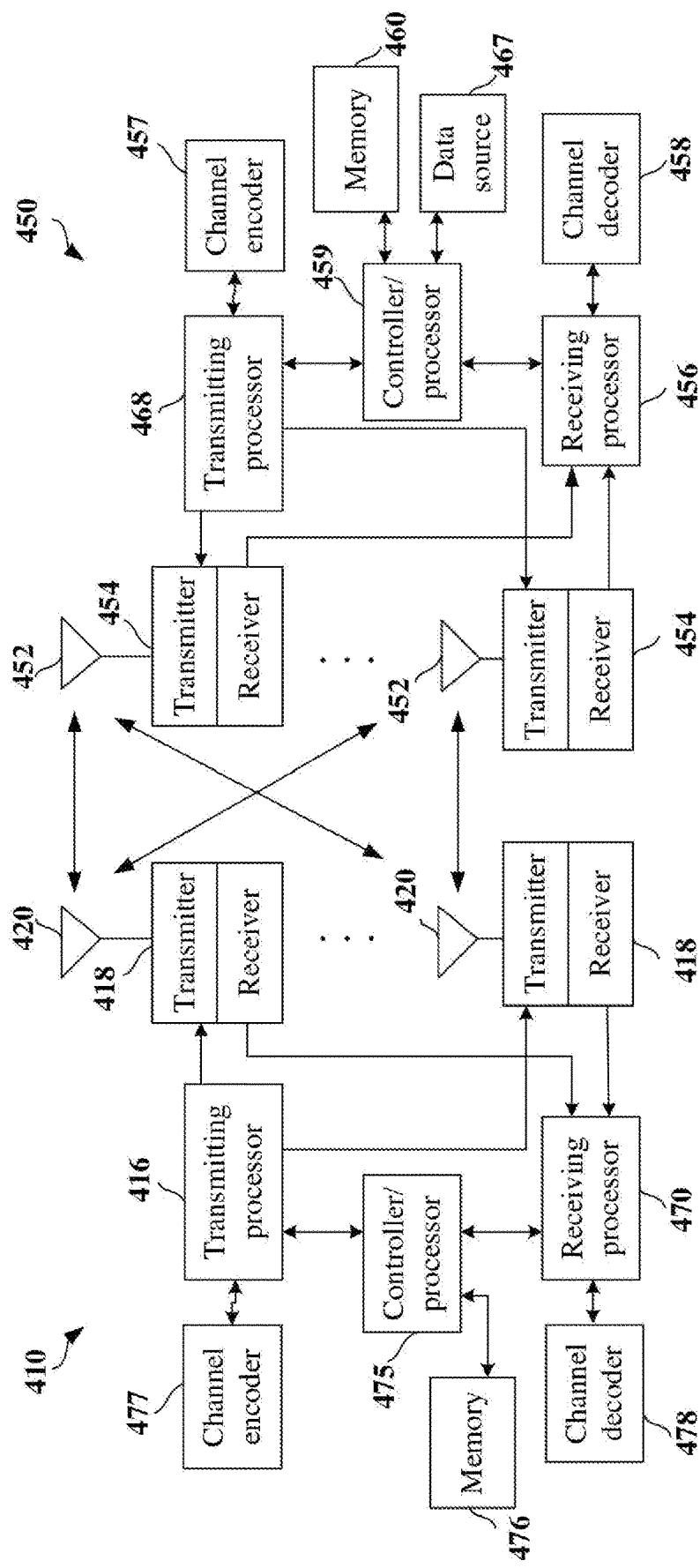
FIG. 4 illustrates a schematic diagram of a New Radio (NR) node and a UE according to one embodiment of the present disclosure.

Embodiment 4 illustrates a schematic diagram of an NR node and a UE, as shown in FIG. 4. FIG. 4 is a block diagram illustrating a UE 450 and a gNB 410 in communication with each other in an access network.

The gNB 410 comprises a controller/processor 475, a memory 476, a receiving processor 470, a transmitting processor 416, a channel encoder 477, a channel decoder 478, a transmitter/receiver 418 and an antenna 420.

The UE 450 comprises a controller/processor 459, a memory 460, a data source 467, a transmitting processor 468, a receiving processor 456, a channel encoder 457 a channel decoder 458 a transmitter/receiver 454 and an antenna 452.

In Downlink (DL) transmission, at the gNB 410, a higher layer packet from a core network is provided to the controller/processor 475. The controller/processor 475 implements the functionality of the L2 layer. In DL, the controller/processor 475 provides header compression, encryption, packet segmentation and reordering, multiplexing between a logical channel and a transport channel, and allocation of radio resources of the UE 450 based on various priorities. The controller/processor 475 is also in charge of HARQ operation, a retransmission of a lost packet and a signaling to the UE450. The transmitting processor 416 and the channel encoder 477 perform signaling processing functions used for the L1 layer (that is, PHY). The channel encoder 477 performs coding and interleaving so as to ensure a Forward Error Correction (FEC) at the UE450 side. The transmitting processor 416 implements the mapping to signal clusters corresponding to each modulation scheme (i.e., BPSK, QPSK, M-PSK, and M-QAM, etc.), and performs spatial precoding/beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. Each transmitter 418 converts a baseband multicarrier symbol stream provided by the transmitting processor 416 into a radio frequency (RF) stream, which is later provided to different antennas 420.

In DL transmission, at the UE450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the channel decoder 458 perform signal processing functions of the L1 layer. The receiving processor 456 converts the baseband multicarrier symbol stream from time domain into frequency domain using FFT. In frequency domain, a physical layer data signal and a reference signal are de-multiplexed by the receiving processor 456, wherein a reference signal is used for channel estimation, while physical layer data is subjected to multi-antenna detection in the receiving processor 456 to recover UE450-targeted spatial streams. Symbols on each spatial stream are demodulated and recovered in the receiving processor 456 to generate a soft decision. Then the channel decoder 458 decodes and de-interleaves the soft decision to recover the higher-layer data and control signal transmitted by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In DL transmission, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In Uplink (UL) transmission, at the UE450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB410 so as to provide the L2 layer functions used for the user plane and the control plane. The controller/processor 459 is also responsible for HARQ operation, retransmission of a lost packet, and a signaling to the gNB 410. The channel encoder 457 performs channel coding, and then encoded data is subjected to modulation and multi-antenna spatial precoding/beamforming by the transmitting processor 468 to be modulated into multicarrier/single-carrier symbol streams. The modulated symbol streams are provided from the transmitter 454 to each antenna 452. Each transmitter 454 first converts a baseband symbol stream provided by the transmitting processor 468 into a radio frequency symbol stream, and then provides the radio frequency symbol stream to the antenna 452.

In UL transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the receiving processor 470. The receiving processor 470 and the channel decoder 478 jointly provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decrypting, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE450 comprises at least one processor and at least one memory. The at least one memory includes computer program codes. The at least one memory and the computer program codes are configured to be used in collaboration with the at least one processor. The UE 450 at least receives the first information of the present disclosure; and transmits the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the UE 450 comprises a memory that stores a computer readable instruction program. The computer readable instruction program generates an action when executed by at least one processor. The action includes: receiving the first information of the present disclosure; and transmitting the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first information of the present disclosure; and receives the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the gNB 410 comprises a memory that stores a computer readable instruction program. The computer readable instruction program generates an action when executed by at least one processor. The action includes: transmitting the first information of the present disclosure; and receiving the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the UE 450 comprises at least one processor and at least one memory. The at least one memory includes computer program codes. The at least one memory and the computer program codes are configured to be used in collaboration with the at least one processor. The UE 450 at least receives the first information of the present disclosure; and receives the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the UE 450 comprises a memory that stores a computer readable instruction program. The computer readable instruction program generates an action when executed by at least one processor. The action includes: receiving the first information of the present disclosure; and receiving the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block (s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first information of the present disclosure; and transmits the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the gNB 410 comprises a memory that stores a computer readable instruction program. The computer readable instruction program generates an action when executed by at least one processor. The action includes: transmitting the first information of the present disclosure; and transmitting the first radio signal of the present disclosure in the M1 of the M frequency sub-band(s) of the present disclosure. Herein, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively.

In one embodiment, the UE 450 corresponds to the first node in the present disclosure, the gNB 410 corresponds to the second node in the present disclosure.

In one embodiment, the gNB 410 corresponds to the first node in the present disclosure, the UE 450 corresponds to the second node in the present disclosure.

In one embodiment, at least one of the antenna 420, the transmitter 418, the transmitting processor 416, the channel encoder 477, the controller/processor 475 or the memory 476 is used for transmitting the first information in the present disclosure; at least one of the antenna 452, the receiver 454, the receiving processor 456, the channel decoder 458, the controller/processor 459, the memory 460 or the data source 467 is used for receiving the first information in the present disclosure.

In one embodiment, at least one of the antenna 452, the transmitter 454, the transmitting processor 468, the channel encoder 457, the controller/processor 459, the memory 460 or the data source 467 is used for transmitting the first radio signal of the present disclosure in the M1 of the M frequency sub-band(s) of the present disclosure; at least one of the antenna 420, the receiver 418, the receiving processor 470, the channel decoder 478, the controller/processor 475 or the memory 476 is used for receiving the first radio signal of the present disclosure in the M1 of the M frequency sub-band(s) of the present disclosure.

In one embodiment, at least one of the antenna 420, the transmitter 418, the transmitting processor 416, the channel encoder 477, the controller/processor 475 or the memory 476 is used for transmitting the first radio signal of the present disclosure in the M1 of the M frequency sub-band(s) of the present disclosure; at least one of the antenna 452, the receiver 454, the receiving processor 456, the channel decoder 458, the controller/processor 459, the memory 460 or the data source 467 is used for receiving the first radio signal of the present disclosure in the M1 of the M frequency sub-band(s) of the present disclosure.

In one embodiment, at least one of the antenna 420, the transmitter 418, the transmitting processor 416, the channel encoder 477, the controller/processor 475 or the memory 476 is used for transmitting the first signaling in the present disclosure; at least one of the antenna 452, the receiver 454, the receiving processor 456, the channel decoder 458, the controller/processor 459, the memory 460 or the data source 467 is used for receiving the first signaling in the present disclosure.

In one embodiment, at least one of the antenna 452, the transmitter 454, the transmitting processor 468, the channel encoder 457, the controller/processor 459, the memory 460 or the data source 467 is used for transmitting the second information in the present disclosure; at least one of the antenna 420, the receiver 418, the receiving processor 470, the channel decoder 478, the controller/processor 475 or the memory 476 is used for the second information in the present disclosure.

In one embodiment, at least one of the antenna 452, the transmitter 454, the transmitting processor 468, the channel encoder 457, the controller/processor 459, the memory 460 or the data source 467 is used for transmitting the second radio signal in the present disclosure; at least one of the antenna 420, the receiver 418, the receiving processor 470, the channel decoder 478, the controller/processor 475 or the memory 476 is used for receiving the second radio signal in the present disclosure.

In one embodiment, at least one of the antenna 420, the transmitter 418, the transmitting processor 416, the channel encoder 477, the controller/processor 475 or the memory 476 is used for transmitting the second radio signal in the present disclosure; at least one of the antenna 452, the receiver 454, the receiving processor 456, the channel decoder 458, the controller/processor 459, the memory 460 or the data source 467 is used for receiving the second radio signal in the present disclosure.

In one embodiment, at least the latter of the transmitting processor 416 and the channel encoder 477 is used for generating the K bit block group(s) in the present disclosure.

In one embodiment, at least the latter of the transmitting processor 468 and the channel encoder 457 is used for generating the K bit block group(s) in the present disclosure.

In one embodiment, the transmitting processor 416 and the channel encoder 477 are used for generating the first modulation symbol sequence in the present disclosure.

In one embodiment, the transmitting processor 468 and the channel encoder 457 are used for generating the first modulation symbol sequence in the present disclosure.

In one embodiment, the transmitting processor 416 is used for mapping the first modulation symbol of the present disclosure into the M time-frequency resource set(s) of the present disclosure.

In one embodiment, the transmitting processor 468 is used for mapping the first modulation symbol of the present disclosure into the M time-frequency resource set(s) of the present disclosure.

In one embodiment, at least one of the antenna 452, the receiver 454 or the receiving processor 456 is used for performing the M channel listening(s) of the present disclosure respectively in the M frequency sub-band(s) of the present disclosure.

In one embodiment, at least one of the antenna 420, the receiver 418 or the receiving processor 470 is used for performing the M channel listening(s) of the present disclosure respectively in the M frequency sub-band(s) of the present disclosure.

In one embodiment, at least one of the antenna 452, the receiver 454, the receiving processor 456 or the channel decoder 458 is used for monitoring the first radio signal of the present disclosure respectively in the M frequency sub-band(s) of the present disclosure.

In one embodiment, at least one of the antenna 420, the receiver 418, the receiving processor 470 or the channel decoder 478 is used for monitoring the first radio signal of the present disclosure respectively in the M frequency sub-band(s) of the present disclosure.

In one embodiment, at least one of the antenna 420, the transmitter 418, the transmitting processor 416, the channel encoder 477, the controller/processor 475 or the memory 476 is used for transmitting the fourth information in the present disclosure; at least one of the antenna 452, the receiver 454, the receiving processor 456, the channel decoder 458, the controller/processor 459, the memory 460 or the data source 467 is used for receiving the fourth information in the present disclosure.

In one embodiment, at least one of the antenna 420, the transmitter 418, the transmitting processor 416, the channel encoder 477, the controller/processor 475 or the memory 476 is used for transmitting the third information in the present disclosure; at least one of the antenna 452, the receiver 454, the receiving processor 456, the channel decoder 458, the controller/processor 459, the memory 460 or the data source 467 is used for receiving the third information in the present disclosure.

Embodiment 5

Figure 5:
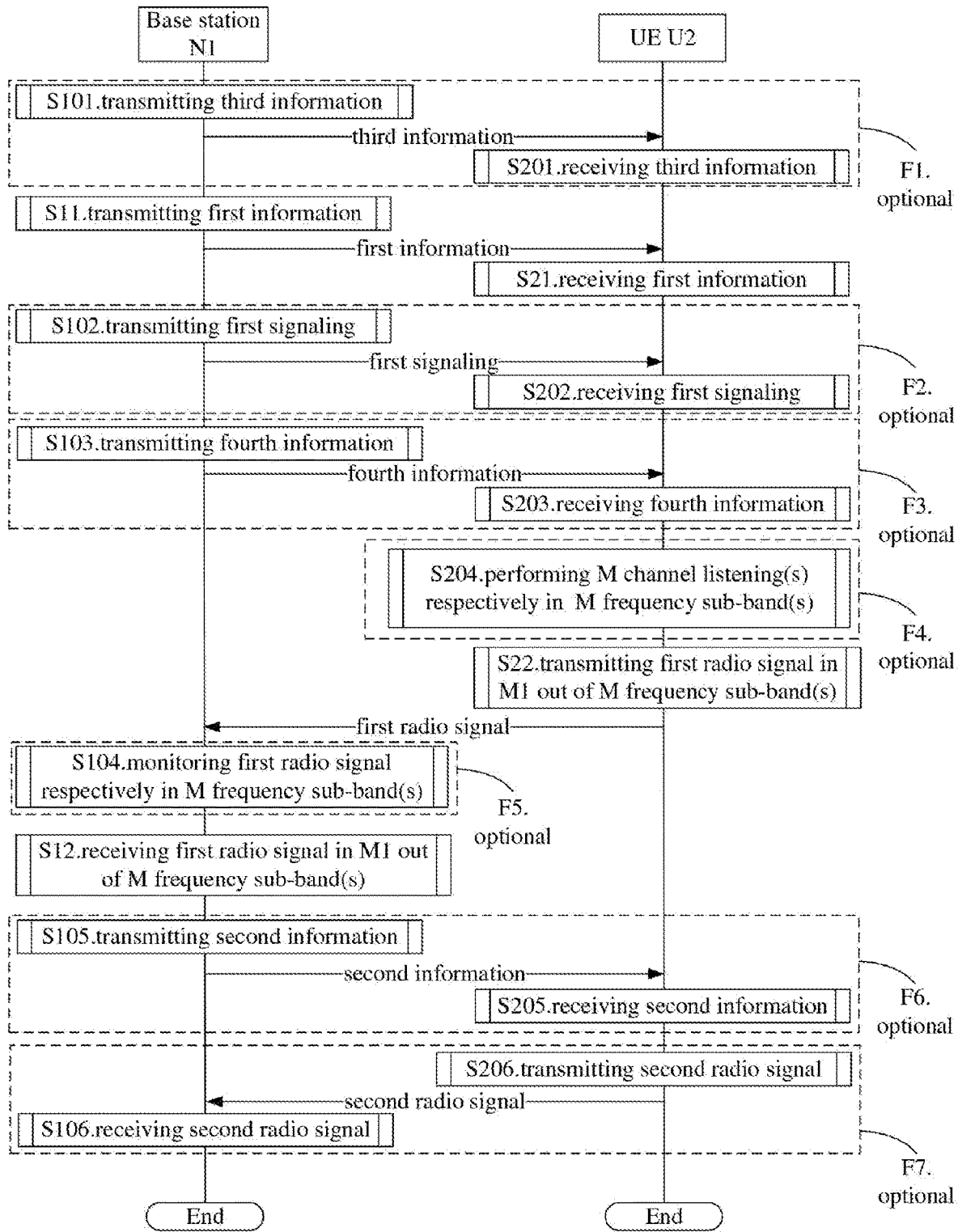
FIG. 5 illustrates a flowchart of transmission according to one embodiment of the present disclosure.

Embodiment 5 illustrates a flowchart of transmission, as shown in FIG. 5. In FIG. 5, a base station N1 is the second node of the present disclosure, while a UE U2 is the first node of the present disclosure. The base station N1 is a maintenance base station for a serving cell of the UE U2. In FIG. 5, steps in boxes F1 through F7 are optional, respectively.

The base station N1 transmits third information in step S101; transmits first information in step S11; transmits a first signaling in step S102; transmits fourth information in step S103; monitors a first radio signal respectively in M frequency sub-band(s) in step S104; receives the first radio signal in M1 of the M frequency sub-band(s) in step S12; transmits second information in step S105; and receives a second radio signal in step S106.

The UE U2 receives third information in step S201; receives first information in step S21; receives a first signaling in step S202; receives fourth information in step S203; performs M channel listening(s) respectively in M frequency sub-band(s) in step S204; transmits a first radio signal in M1 of the M frequency sub-band(s) in step S22; receives second information in step S205; and transmits a second radio signal in step S206.

In Embodiment 5, the first information is used by the U2 for determining S candidate integers; K1 of K bit block group(s) is(are) used by the U2 for generating the first radio signal, any of the K bit block group(s) comprises a positive integer number of code block(s); the K is one of S1 candidate integer(s), the M is used by the U2 for determining the S1 candidate integer(s) out of the S candidate integers; the M, the K and the S are respectively positive integers; the M1, the K1 and the S1 are positive integers no greater than the M, the K and the S respectively. A first TB is used by the U2 for generating the K bit block group(s), the first signaling is used by the U2 for determining the size of the first TB. The second information is used by the U2 for determining whether each of the K bit block group(s) is correctly received. The first radio signal and the second radio signal belong to a same HARQ process; K2 of the K bit block group(s) is(are) used by the U2 for generating the second radio signal, the K2 is a positive integer not greater than the K. The M channel listening(s) is(are) used by the U2 for determining that the first radio signal can be transmitted in the M1 of the M frequency sub-band(s). The fourth information is used by the U2 for determining a type of the M channel listening(s). The third information is used by the U2 for determining M0 frequency sub-band(s), any of the M frequency sub-band(s) is one of the M0 frequency sub-band(s); the M0 is a positive integer no less than the M.

In one embodiment, the first node is a UE, the operating action in the present disclosure is receiving.

In one embodiment, the second node is a base station, the processing action in the present disclosure is transmitting.

In one embodiment, the first transport block is a TB.

In one embodiment, the first transport block comprises a TB.

In one embodiment, a reference bit block group is any of the K bit block group(s); the second information indicates that any code blocks comprised in the reference bit block group is correctly received, or the second information indicates that a code block comprised in the reference bit block group is not correctly received.

In one subembodiment, the second information indicates that all code blocks comprised in the reference bit block group are correctly decoded.

In one subembodiment, the second information indicates that at least one code block comprised in the reference bit block group is not correctly received.

In one embodiment, the K bit block group(s) is(are) used by the U2 for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set.

In one embodiment, the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used by the U2 for generating the M sub-sequence(s).

In one embodiment, the type of the M channel listening(s) is(are) used by the U2 for determining a mapping mode of the first modulation symbol sequence into the M frequency sub-band(s).

In one embodiment, the M1 is less than the M, the second node in the present disclosure receives the first radio signal only in the M1 frequency sub-band(s) of the M frequency sub-bands.

In one embodiment, the action of monitoring the first radio signal is realized through energy detection, namely, sensing the energy of a radio signal respectively in the M frequency sub-band(s) and then averaging according to time to acquire a received energy. When the received energy is greater than a first given threshold in any given frequency sub-band of the M frequency sub-band(s), it is determined that the first radio signal is received in the given frequency sub-band; when the received energy is not greater than the first given threshold in any given frequency sub-band of the M frequency sub-band(s), it is determined that the first radio signal is not received in the given frequency sub-band.

In one embodiment, the action of monitoring the first radio signal is realized through coherent detection, namely, performing coherent reception respectively in the M frequency sub-band(s), and then measuring the energy of a signal acquired after the coherent reception. When the energy of the signal acquired after the coherent reception is greater than a second given threshold in any given frequency sub-band of the M frequency sub-band(s), it is determined that the first radio signal is received in the given frequency sub-band; when the energy of the signal acquired after the coherent reception is not greater than the second given threshold in any given frequency sub-band of the M frequency sub-band(s), it is determined that the first radio signal is not received in the given frequency sub-band.

In one embodiment, the action of monitoring the first radio signal is realized through blind detection, namely, receiving a radio signal(s) respectively in the M frequency sub-band(s) and performing decoding. When the decoding is determined as correct according to a check bit in any given frequency sub-band of the M frequency sub-band(s), it is determined that the first radio signal is received in the given frequency sub-band; when the decoding is determined as incorrect according to a check bit in any given frequency sub-band of the M frequency sub-band(s), it is determined that the first radio signal is not received in the given frequency sub-band.

In one embodiment, the first information is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the first radio signal is transmitted on an uplink physical layer data channel (i.e., an uplink channel capable of carrying physical layer data), the first node is a UE, the second node is a base station.

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a New Radio PUSCH (NR-PDSCH).

In one embodiment, the uplink physical layer data channel is a Narrow Band PUSCH (NB-PUSCH).

In one embodiment, a transmission channel for the first radio signal is an Uplink Shared Channel (UL-SCH), the first node is a UE, the second node is a base station.

In one embodiment, the first signaling is transmitted on a downlink physical layer data channel (i.e., a downlink channel capable of carrying physical layer data).

In one embodiment, the first signaling is transmitted on a PDSCH.

In one embodiment, the first signaling is transmitted on a downlink physical layer control channel (i.e., a downlink channel only capable of carrying a physical layer signaling).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the second information is transmitted on a downlink physical layer control channel (i.e., a downlink channel only capable of carrying a physical layer signaling), the first node is a UE, the second node is a base station.

In one embodiment, the second information is transmitted on a PDCCH, the first node is a UE, the second node is a base station.

In one embodiment, the second radio signal is transmitted on an uplink physical layer data channel (i.e., an uplink channel capable of carrying physical layer data), the first node is a UE, the second node is a base station.

In one embodiment, the second radio signal is transmitted on a PUSCH, the first node is a UE, the second node is a base station.

In one embodiment, a transmission channel for the second radio signal is a UL-SCH, the first node is a UE, the second node is a base station.

In one embodiment, the third information is transmitted on a downlink physical layer data channel (i.e., a downlink channel capable of carrying physical layer data).

In one embodiment, the third information is transmitted on a PDSCH.

Embodiment 6

Figure 6:
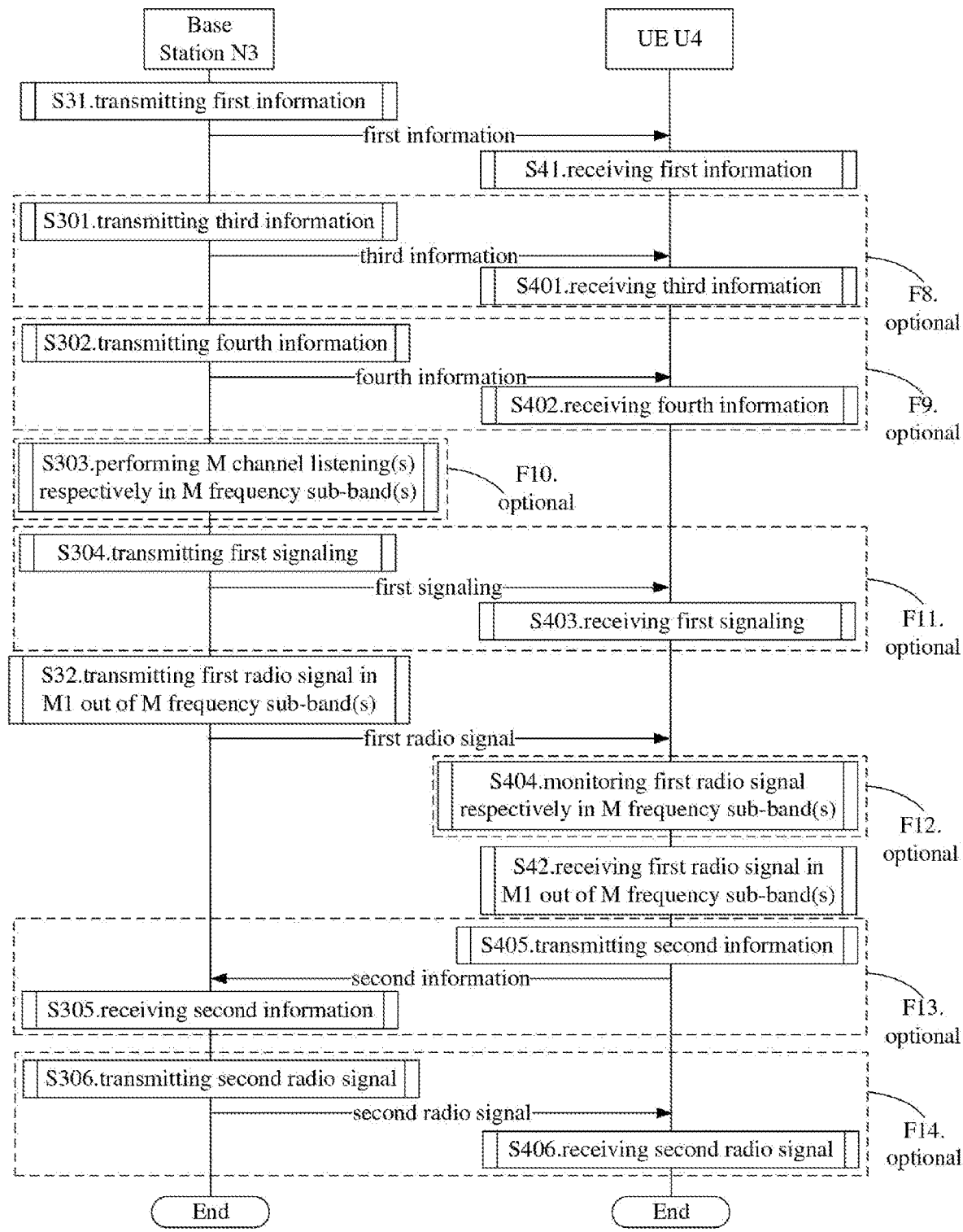
FIG. 6 illustrates a flowchart of transmission according to one embodiment of the present disclosure.

Embodiment 6 illustrates a flowchart of wireless transmission, as shown in FIG. 6. In FIG. 6, a base station N3 is the first node of the present disclosure, a UE U4 is the second node of the present disclosure. The base station N3 is a maintenance base station for a serving cell of the UE U4. In FIG. 6, steps in boxes F8 through F14 are optional, respectively.

The base station N3 transmits first information in step S31; transmits third information in step S301; transmits fourth information in step S302; performs M channel listening(s) respectively in M frequency sub-band(s) in step S303; transmits a first signaling in step S304; transmits a first radio signal in M1 of the M frequency sub-band(s) in step S32; receives second information in step S305; and transmits a second radio signal in step S306.

The UE U4 receives first information in step S41; receives third information in step S401; receives fourth information in step S402; receives a first signaling in step S403; monitors a first radio signal respectively in M frequency sub-band(s) in step S404; receives the first radio signal in M1 of the M frequency sub-band(s) in step S42; transmits second information in step S405; and receives a second radio signal in step S406.

In Embodiment 6, K1 of K bit block group(s) is(are) used by the N3 for generating the first radio signal. A first TB is used by the N3 for generating the K bit block group(s). The second information is used by the N3 for determining whether each of the K bit block group(s) is correctly received. K2 of the K bit block group(s) is(are) used by the N3 for generating the second radio signal. The M channel listening(s) is(are) used by the N3 for determining that the first radio signal can be transmitted in the M1 of the M frequency sub-band(s).

In one embodiment, the first node is a base station, the operating action in the present disclosure is transmitting.

In one embodiment, the second node is a UE, the processing action in the present disclosure is receiving.

In one embodiment, the first radio signal is transmitted on a downlink physical layer data channel (i.e., a downlink channel capable of carrying physical layer data), the first node is a base station, the second node is a UE.

In one embodiment, the first radio signal is transmitted on a PDSCH, the first node is a base station, the second node is a UE.

In one embodiment, a transmission channel for the first radio signal is a Downlink Shared Channel (DL-SCH), the first node is a base station, the second node is a UE.

In one embodiment, the second information is transmitted on an uplink physical layer data channel (i.e., an uplink channel capable of carrying physical layer data), the first node is a base station, the second node is a UE.

In one embodiment, the second information is transmitted on a PUSCH, the first node is a base station, the second node is a UE.

In one embodiment, the second information is transmitted on an uplink physical layer control channel (i.e., an uplink channel only capable of carrying a physical layer signaling), the first node is a base station, the second node is a UE.

In one embodiment, the uplink physical layer control channel is a Physical Uplink Control CHannel (PUCCH).

In one embodiment, the uplink physical layer control channel is a short PUCCH (sPUCCH).

In one embodiment, the uplink physical layer control channel is a New Radio PUCCH (NR-PUCCH).

In one embodiment, the uplink physical layer control channel is a Narrow Band PUCCH (NB-PUCCH).

In one embodiment, the second radio signal is transmitted on a downlink physical layer data channel (i.e., a downlink channel capable of carrying physical layer data), the first node is a base station, the second node is a UE.

In one embodiment, the second radio signal is transmitted on a PDSCH, the first node is a base station, the second node is a UE.

In one embodiment, a transmission channel for the second radio signal is a DL-SCH, the first node is a base station, the second node is a UE.

Embodiment 7

Figure 7:
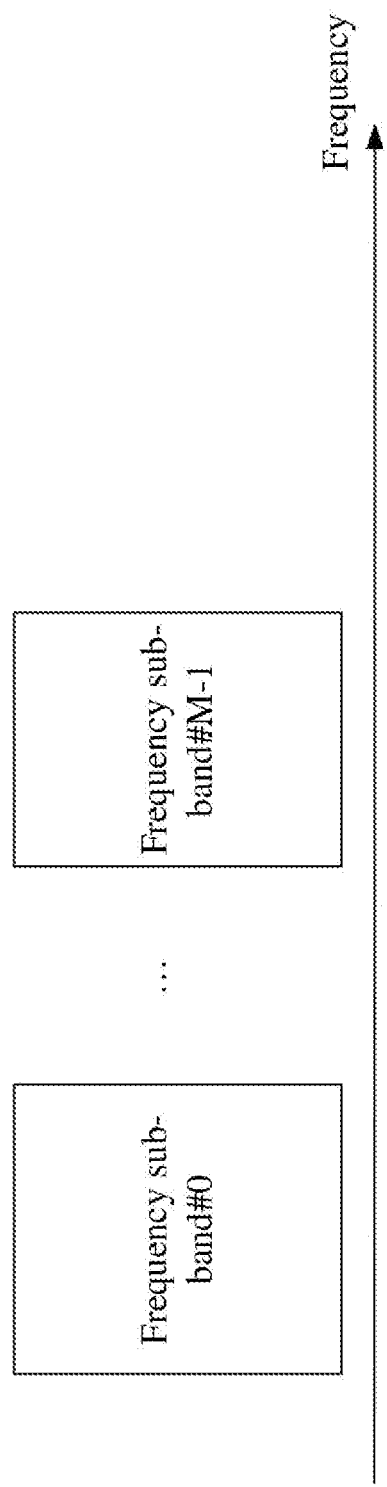
FIG. 7 illustrates a schematic diagram of M frequency sub-band(s) according to one embodiment of the present disclosure.

Embodiment 7 illustrates a schematic diagram of M frequency sub-band(s); as shown in FIG. 7.

In Embodiment 7, any two of the M frequency sub-bands are orthogonal (that is, non-overlapping) in frequency domain. In FIG. 7, indices of the M frequency sub-bands are #0, . . . , and #M-1, respectively.

In one embodiment, the M frequency sub-bands are all deployed on Unlicensed Spectrum.

In one embodiment, any of the M frequency sub-bands comprises a carrier.

In one embodiment, any of the M frequency sub-bands comprises a plurality of carriers.

In one embodiment, any of the M frequency sub-bands comprises a Bandwidth Part (BWP) of a carrier.

In one embodiment, any of the M frequency sub-bands comprises a plurality of BWPs of a carrier.

In one embodiment, the M frequency sub-bands belong to a same carrier.

In one embodiment, the M frequency sub-bands belong to a same BWP of a carrier.

In one embodiment, any of the M frequency sub-bands is a smallest frequency domain unit of LBT.

In one embodiment, any of the M frequency sub-bands is a consecutive frequency domain interval.

In one embodiment, any of the M frequency sub-bands comprises a positive integer number of consecutive subcarriers in frequency domain.

In one embodiment, any of the M frequency sub-bands comprises a positive integer number of consecutive Physical Resource Blocks (PRBs) in frequency domain.

In one embodiment, any of the M frequency sub-bands comprises a positive integer number of consecutive Resource Blocks (RBs) in frequency domain.

In one embodiment, any two of the M frequency sub-bands have equal bandwidths.

In one embodiment, at least two of the M frequency sub-bands have unequal bandwidths.

In one embodiment, any of the M frequency sub-bands has a bandwidth of 20 MHz.

In one embodiment, the M frequency sub-bands are consecutive in frequency domain.

In one embodiment, at least two adjacent frequency sub-bands of the M frequency sub-bands are non-consecutive in frequency domain.

In one embodiment, there is a guard interval between any two adjacent frequency sub-bands of the M frequency sub-bands in frequency domain.

Embodiment 8

Figure 8:
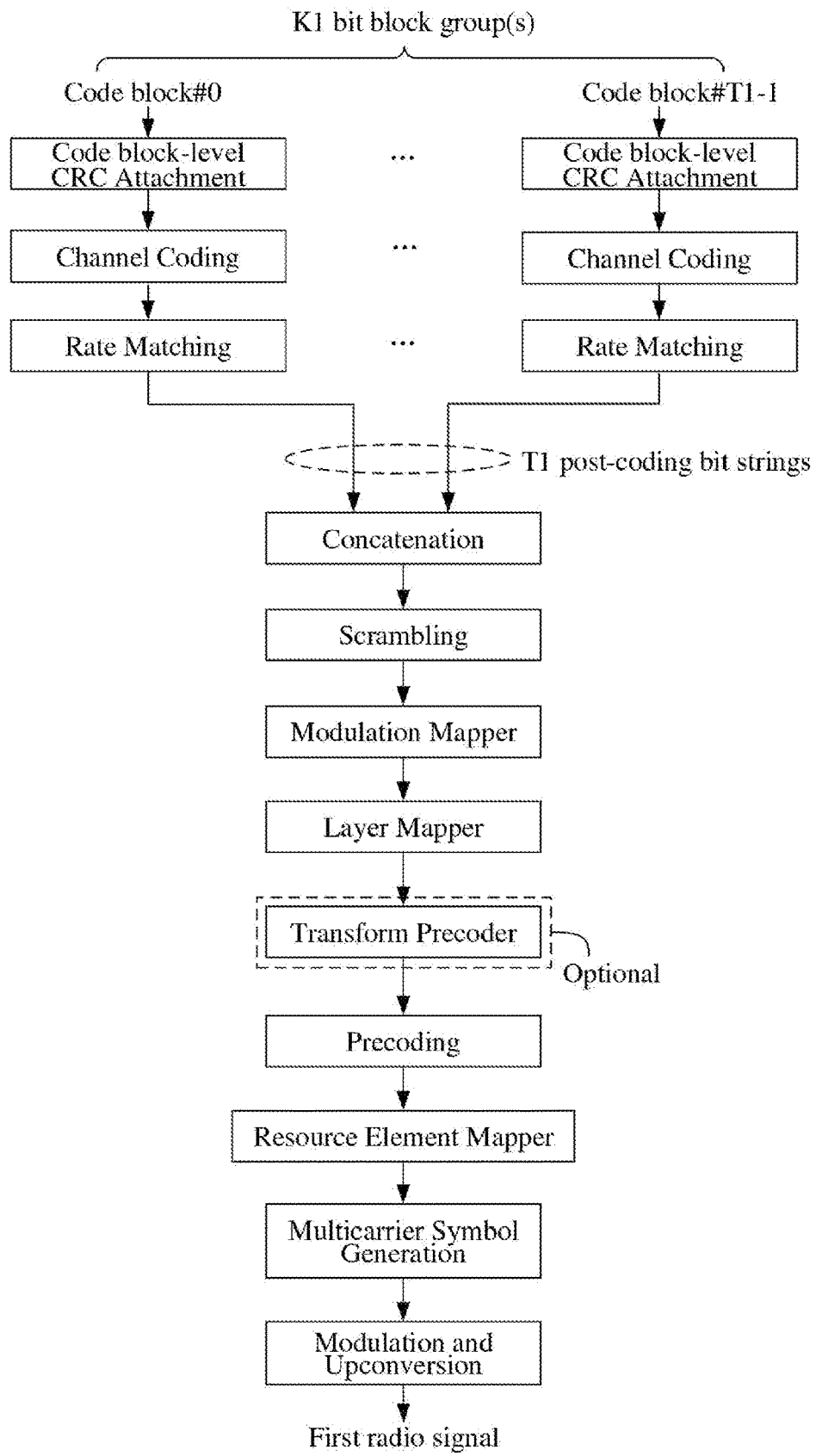
FIG. 8 illustrates a schematic diagram of K1 bit block group(s) being used for generating a first radio signal according to one embodiment of the present disclosure.

Embodiment 8 illustrates a schematic diagram of K1 bit block group(s) being used for generating a first radio signal; as shown in FIG. 8.

In Embodiment 8, the K1 bit block group(s) comprises (comprise) T1 code block(s), the T1 is a positive integer. In FIG. 8, the index (indices) of the T1 code block(s) is(are) #0, . . . , and #T1-1, respectively. Steps marked with the dotted ellipse in FIG. 8 are optional.

In one embodiment, the K1 bit block group(s) is(are) composed of T1 code block(s).

In one embodiment, the phrase that the K1 bit block group(s) is(are) used for generating the first radio signal includes: bits in the T1 code block(s) are respectively subjected to Code Block-level Cyclic Redundancy Check (CRC) Attachment, Channel Coding and Rate Matching in sequence to acquire T1 post-coding bit string(s); the first radio signal is an output after the T1 post-coding bit string(s) is(are) sequentially subjected to Concatenation, Scrambling, a Modulation Mapper, a Layer Mapper, a transform precoder, Precoding, a Resource Element Mapper, Multicarrier Symbol Generation, and Modulation and Upconversion.

In one embodiment, the phrase that the K1 bit block group(s) is(are) used for generating the first radio signal includes: bits in the T1 code block(s) are respectively subjected to Code Block-level CRC Attachment, Channel Coding and Rate Matching in sequence to acquire T1 post-coding bit string(s); the first radio signal is an output after the T1 post-coding bit string(s) is(are) sequentially subjected to Concatenation, Scrambling, a Modulation Mapper, a Layer Mapper, Precoding, a Resource Element Mapper, Multicarrier Symbol Generation, and Modulation and Upconversion.

In one embodiment, the T1 is greater than 1.

In one embodiment, the T1 is equal to 1.

In one embodiment, any two of the T1 code blocks comprise equal numbers of bits.

In one embodiment, any of the T1 post-coding bit string(s) comprises a positive integer number of bits.

In one embodiment, any two of the T1 post-coding strings comprise equal numbers of bits.

In one embodiment, at least two of the T1 post-coding strings comprise unequal numbers of bits.

In one embodiment, the T1 code blocks correspond to separate CRC Attachment.

In one embodiment, the T1 code blocks correspond to separate channel coding.

In one embodiment, the T1 code blocks correspond to separate rate matching.

Embodiment 9

Figures 9, 10:
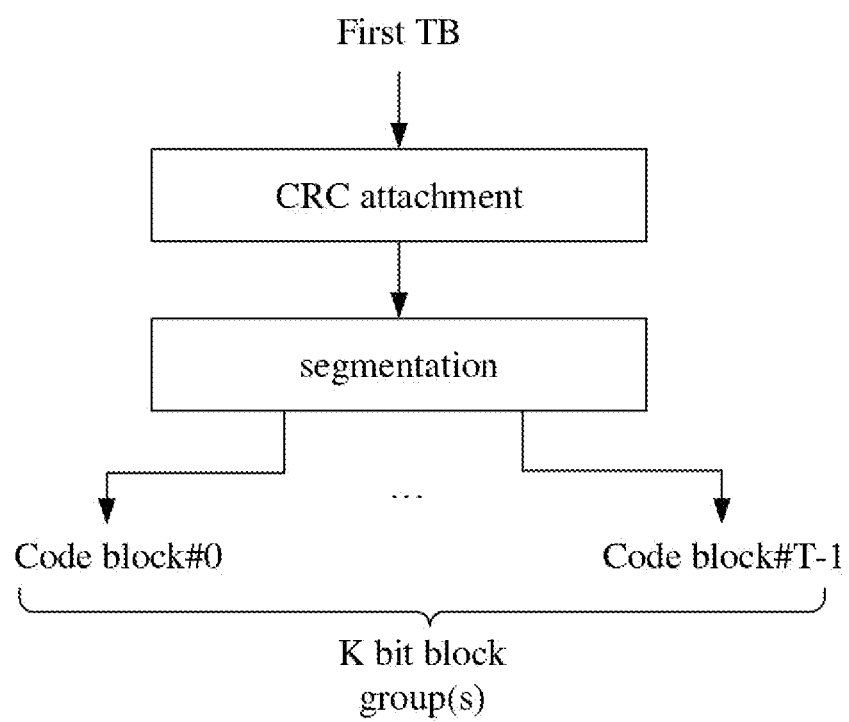
FIG. 9 illustrates a schematic diagram of a first signaling being used for determining the size of a first TB according to one embodiment of the present disclosure.
FIG. 10 illustrates a schematic diagram of a first TB being used for generating K bit block group(s) according to one embodiment of the present disclosure.

Embodiment 9 illustrates a schematic diagram of a first signaling being used for determining the size of a first TB; as shown in FIG. 9.

In Embodiment 9, the first TB is used for generating the K bit block group(s) in the present disclosure, K1 of the K bit block group(s) is(are) used for generating the first radio signal in the present disclosure.

In one embodiment, the first signaling is a higher layer signaling.

In one embodiment, the first signaling is an RRC signaling.

In one embodiment, the first signaling is a MAC CE signaling.

In one embodiment, the first signaling comprises part of or all information of a ConfiguredGrantConfig IE.

In one embodiment, for the specific meaning of ConfiguredGrantConfig IE, refer to 3GPP TS38.331.

In one embodiment, the first signaling comprises part of or all information of an AUL-Config IE.

In one embodiment, for the specific meaning of the AUL-Config IE, refer to 3GPP TS36.331.

In one embodiment, the first signaling is a physical layer signaling.

In one embodiment, the first signaling is a dynamic signaling.

In one embodiment, the first signaling is a L1 layer signaling.

In one embodiment, the first signaling is a control signaling on the L1 layer.

In one embodiment, the first signaling includes a dynamic signaling used for UpLink Grant.

In one embodiment, the first signaling includes a dynamic signaling used for DownLink Grant.

In one embodiment, the first signaling includes a dynamic signaling used for Configured UL grant.

In one embodiment, the first signaling includes a dynamic signaling used for Configured UL grant activation.

In one embodiment, the first signaling includes a dynamic signaling used for Autonomous UpLink (AUL) activation.

In one embodiment, the first signaling comprises Downlink Control Information (DCI).

In one embodiment, the first signaling comprises DCI used for UpLink Grant.

In one embodiment, the first signaling comprises DCI used for DownLink Grant.

In one embodiment, the first signaling comprises DCI used for Configured UL grant.

In one embodiment, the first signaling comprises DCI used for Configured UL grant activation.

In one embodiment, the first signaling comprises DCI used for Configured UL grant Type 2 activation.

In one embodiment, the first signaling comprises DCI used for AUL activation.

In one embodiment, the first signaling is UE-specific.

In one embodiment, the first signaling comprises DCI identified by a Cell-Radio Network Temporary Identifier (C-RNTI).

In one embodiment, the first signaling comprises DCI with CRC scrambled by a C-RNTI.

In one embodiment, the first signaling comprises DCI identified by a Configured Scheduling (CS)-RNTI.

In one embodiment, the first signaling comprises DCI scrambled by a CS-RNTI.

In one embodiment, the first signaling comprises DCI identified by an AUL C-RNTI.

In one embodiment, the first signaling comprises DCI with CRC scrambled by an AUL C-RNTI.

In one embodiment, the first signaling is transmitted in the M frequency sub-band(s) in the present disclosure.

In one embodiment, the first signaling is transmitted in a frequency band(s) other than the M frequency sub-band(s) in the present disclosure.

In one embodiment, the first signaling is transmitted in a frequency band(s) deployed on Unlicensed License.

In one embodiment, the first signaling is transmitted in a frequency band(s) deployed on Licensed License.

In one embodiment, the first transport block is a TB.

In one embodiment, the first transport block comprises a TB.

In one embodiment, the size of the first TB is Transport Block Size (TBS).

In one embodiment, the first TB comprises a positive integer number of bits.

In one embodiment, all bits comprised in the first TB are sequentially arranged.

In one embodiment, the size of the first TB refers to a number of bits comprised by the first TB.

In one embodiment, the first signaling indicates the size of the first TB.

In one embodiment, the first signaling implicitly indicates the size of the first TB.

In one embodiment, the first signaling is used for determining time-frequency resources occupied by the first radio signal.

In one embodiment, the first signaling indicates time-frequency resources occupied by the first radio signal.

In one embodiment, the first signaling explicitly indicates time-frequency resources occupied by the first radio signal.

In one embodiment, the first signaling implicitly indicates time-frequency resources occupied by the first radio signal.

In one embodiment, the first signaling indicates a Modulation and Coding Scheme (MCS) corresponding to the radio signal.

In one embodiment, the first signaling explicitly indicates an MCS corresponding to the first radio signal.

In one embodiment, the size of time-frequency resources occupied by the first radio signal and the MCS corresponding to the first radio signal are jointly used for determining the size of the first TB.

In one embodiment, the first radio signal does not include DeModulation Reference Signals (DMRS).

In one embodiment, the size of time-frequency resources occupied by the first radio signal includes a number of REs occupied by the first radio signal.

In one embodiment, the first signaling indicates configuration information of DMRS of the first radio signal.

In one embodiment, the configuration information of the DMRS includes one or more of time domain resources occupied, frequency domain resources occupied, code domain resources occupied, an RS sequence, a mapping mode, type of DMRS, cyclic shift, an Orthogonal Cover Code (OCC), $w_f(k')$, or $w_t(l')$. The $w_f(k')$ and $w_t(l')$ are respectively spreading sequences in frequency domain and time domain; for the specific meaning of the $w_f(k')$ and the $w_t(l')$, refer to 3GPP TS38.211, section 6.4.1.

In one embodiment, the first signaling is used for determining the M time-frequency resource set(s) in the present disclosure.

In one embodiment, the first signaling indicates the M time-frequency resource set(s) in the present disclosure.

In one embodiment, the number of REs occupied by the M time-frequency resource set(s) and the MCS corresponding to the first radio signal in the present disclosure are jointly used for determining the size of the first TB.

In one embodiment, the first radio signal is a retransmission of the K bit block group(s); any of the K bit block group(s) is one of K0 bit block group(s), the first TB is used for generating the K0 bit block group(s), the K0 is a positive integer not less than the K; the first signaling comprises a first field, the first field of the first signaling indicates the K bit block group(s) out of the K0 bit block group(s).

In one subembodiment of the above embodiment, the first radio signal is the retransmission of the K bit block group(s).

In one subembodiment of the above embodiment, the first radio signal is the retransmission of the first TB.

In one subembodiment of the above embodiment, the first field of the first signaling comprises all or part of information of a CBG Transmission Information (CBGTI) field.

In one subembodiment of the above embodiment, the first field of the first signaling is a CBGTI field.

In one subembodiment of the above embodiment, the K is equal to the K0.

In one subembodiment of the above embodiment, the K is less than the K0.

In one subembodiment of the above embodiment, the K bit block group(s) respectively corresponds (correspond) to K bit(s) in the first field of the first signaling.

In one subembodiment of the above embodiment, the first field of the first signaling comprises K0 bit(s), the K0 bit(s) respectively corresponds(correspond) to the K0 bit block group(s); for any given bit block group of the K0 bit block group(s), if a bit of the K0 bit(s) corresponding to the given bit block group is equal to a first value, the given bit block group is one of the K bit block group(s); if the bit of the K0 bit(s) corresponding to the given bit block group is unequal to a first value, the given bit block group is not one of the K bit block group(s)

In one exemplary subembodiment of the above embodiment, the first value is 1.

In one exemplary subembodiment of the above embodiment, the first value is 0.

In one embodiment, for the specific meaning of the CBGTI, refer to 3GPP TS38.212, section 7.3.

Embodiment 10

Embodiment 10 illustrates a schematic diagram of a first TB being used for generating K bit block group(s); as shown in FIG. 10.

In Embodiment 10, the K bit block group(s) comprises (comprise) T code block(s), the T is a positive integer. In FIG. 10, index(indices) of the T code block(s) is(are) #0, . . . , #T-1, respectively.

In one embodiment, a total number of code block(s) comprised in the K bit block group(s) is the T.

In one embodiment, the K bit block group(s) is(are) composed of T code block(s).

In one embodiment, the T is greater than 1.

In one embodiment, the T is equal to 1.

In one embodiment, any two of the T code blocks comprise equal numbers of bits.

In one embodiment, the number of bits comprised in any of the T code block(s) is 8424.

In one embodiment, the number of bits comprised in any of the T code block(s) is 3816.

In one embodiment, the phrase that the first TB is used for generating the K bit block group(s) includes: all bits in the first TB are sequentially subjected to CRC Attachment and Segmentation to acquire the T code block(s), the T code block(s) is(are) divided into the K bit block group(s); any of the K bit block group(s) comprises a positive integer number of code block(s) of the T code block(s).

In one embodiment, any two of the K bit block groups comprise equal numbers of code blocks.

In one embodiment, any bit block group of J1 of the K bit block groups comprises one more code block than any bit block group of the other K-J1 bit block group(s), the J1 is a positive integer less than the K.

In one embodiment, the number of code blocks comprised by any bit block group of J1 of the K bit block groups is equal to $\lceil T/K \rceil$, while the number of code blocks comprised by any bit block group of the other K-J1 bit block group(s) is equal to $\lfloor T/K \rfloor$, the J1 is equal to mod(T, K).

In one subembodiment, a bit block group indexed with i of the K bit block groups comprises code blocks indexed from $i \cdot \lceil T/K \rceil$ to $i \cdot \lceil T/K \rceil + \lceil T/K \rceil - 1$ out of the T code blocks, the i is any non-negative integer less than the J1.

In one subembodiment, a bit block group indexed with i of the K bit block groups comprises code blocks indexed from $J1 \cdot \lceil T/K \rceil + (i-J1) \cdot \lfloor T/K \rfloor$ to $J1 \cdot \lceil T/K \rceil + (i-J1) \cdot \lfloor T/K \rfloor + \lfloor T/K \rfloor - 1$ out of the T code blocks, the i is any positive integer less than the K but is not less than the J1.

In one embodiment, index(indices) of the K bit block group(s) is(are) #0, . . . , and #K-1, respectively.

Embodiment 11

Figure 11:
FIG. 11 illustrates a schematic diagram of second information according to one embodiment of the present disclosure.

Embodiment 11 illustrates a schematic diagram of second information; as shown in FIG. 11.

In Embodiment 11, the second information carries K bit(s), the K bit(s) respectively indicates(indicate) the K bit block group(s) of the present disclosure is(are) correctly received.

In one embodiment, the second information is carried by a physical layer signaling.

In one embodiment, the second information is carried by a dynamic signaling.

In one embodiment, the second information includes Uplink Control Information (UCI), the first node in the present disclosure is a base station.

In one embodiment, the second information includes DCI, the first node in the present disclosure is a UE.

In one embodiment, the second information includes Hybrid Automatic Repeat reQuest-Acknowledgement (HARQ-ACK), the first node in the present disclosure is a base station.

In one embodiment, the second information includes all or part of information in the CBGTI field, the first node in the present disclosure is a UE.

In one embodiment, the second information is transmitted in the M frequency sub-band(s) in the present disclosure.

In one embodiment, the second information is transmitted in a frequency band(s) other than the M frequency sub-band (s) in the present disclosure.

In one embodiment, the second information is transmitted in a frequency band deployed on Unlicensed Spectrum.

In one embodiment, the second information is transmitted in a frequency band deployed on Licensed Spectrum.

In one embodiment, for any given bit block group of the K bit block group(s), if one of the K bit(s) corresponding to the given bit block group is equal to a second value, the first node of the present disclosure assumes that all code blocks in the given bit block group are correctly received; if one of the K bit(s) corresponding to the given bit block group is equal to a third value, the first node of the present disclosure assumes that at least one code block in the given bit block group is not correctly received.

In one subembodiment, the second value is equal to 1, the third value is equal to 0.

In one subembodiment, the second value is equal to 0, the second value is equal to 1.

In one subembodiment, the second value is ACK, the third value is Negative ACKnowledgement (NACK).

In one embodiment, the phrase that the second information is used for determining whether each of the K bit block group(s) is correctly received means that the second information is used for determining whether code blocks comprised by each of the K bit block group(s) are correctly received.

In one embodiment, the first node in the present disclosure determines according to the second information that all code blocks comprised by the reference bit block group in the present disclosure are correctly received, or none of code blocks comprised by the reference bit block group is correctly received.

In one embodiment, the first node in the present disclosure determines according to the second information that all code blocks comprised by the reference bit block group in the present disclosure are correctly received, or at least one code block comprised by the reference bit block group is not correctly received.

In one embodiment, the first node in the present disclosure determines according to the second information not to retransmit code blocks comprised by the reference bit block group, or to retransmit all code blocks comprised by the reference bit block group.

Embodiment 12

Figure 12:
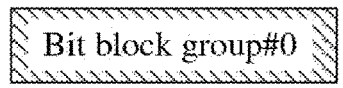
FIG. 12 illustrates a schematic diagram of K bit block group(s), K1 bit block group(s) and K2 bit block group(s) according to one embodiment of the present disclosure.
Figure 12:
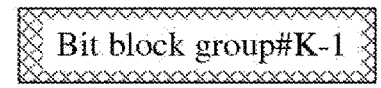

Embodiment 12 illustrates a schematic diagram of K bit block group(s), K1 bit block group(s) and K2 bit block group(s); as shown in FIG. 12. In Embodiment 12, the first radio signal and the second radio signal of the present disclosure belong to a same HARQ process. The K1 of the K bit block group(s) is(are) used for generating the first radio signal, the K2 of the K bit block group(s) is(are) used for generating the second radio signal. In FIG. 12, index(indices) of the K bit block group(s) is(are) #0, . . . , and #K-1, respectively.

In one embodiment, the second radio signal is a retransmission of the K2 bit block group(s).

In one embodiment, the second radio signal is a retransmission of the first TB of the present disclosure.

In one embodiment, the first radio signal and the second radio signal correspond to a same HARQ process number.

In one embodiment, the second radio signal is transmitted in the M frequency sub-band(s) in the present disclosure.

In one embodiment, the second radio signal is transmitted in a frequency band(s) other than the M frequency sub-band(s) in the present disclosure.

In one embodiment, the second radio signal is transmitted in a frequency band deployed on Unlicensed Spectrum.

In one embodiment, the second radio signal is transmitted in a frequency band deployed on Licensed Spectrum.

In one embodiment, the second radio signal and the first radio signal occupy equal positive integer numbers of frequency sub-band(s) of the M frequency sub-band(s).

In one embodiment, at least one of frequency sub-bands occupied by the second radio signal is not occupied by the first radio signal.

In one embodiment, at least one of frequency sub-bands occupied by the first radio signal is not occupied by the second radio signal.

In one embodiment, the K2 is less than the K.
In one embodiment, the K2 is equal to the K.
In one embodiment, the K2 is less than the K1.
In one embodiment, the K2 is equal to the K1.
In one embodiment, the K2 is greater than the K1.
In one embodiment, the K2 is less than the K, among the K bit block groups only K2 bit block group(s) is(are) used for generating the second radio signal.

In one embodiment, at least one of the K1 bit block groups does not belong to the K2 bit block group(s).

In one embodiment, at least one of the K1 bit block groups is not used for generating the second radio signal.

In one embodiment, at least one of the K2 bit block groups does not belong to the K1 bit block group(s).

In one embodiment, at least one of the K2 bit block groups is not used for generating the first radio signal.

In one embodiment, the first node in the present disclosure receives a second signaling, the second node in the present disclosure transmits the second signaling; the second signaling comprises scheduling information of the second radio signal; the first node is a UE, the second node is a base station.

In one embodiment, the first node in the present disclosure transmits a second signaling, the second node in the present disclosure receives the second signaling; the second signaling comprises scheduling information of the second radio signal; the first node is a base station, the second node is a UE.

In one embodiment, the scheduling information of the second radio signal includes at least one of time domain resources occupied, frequency domain resources occupied, an MCS, configuration information of DMRS, a HARQ process number, a Redundancy Version (RV), a New Data Indicator (NDI) or corresponding Spatial Rx parameters.

In one embodiment, the second signaling comprises a second field, the second field of the second signaling indicates the K2 bit block(s) out of the K bit block group(s).

In one subembodiment, the second field of the second signaling comprises all or part of information of a CBGTI field.

In one subembodiment, the second field of the second signaling is a CBGTI field.

In one subembodiment, the K2 bit block group(s) respectively corresponds(correspond) to K2 bit(s) in the second field of the second signaling.

In one subembodiment, the second field of the second signaling comprises K bit(s), the K bit(s) respectively corresponds(correspond) to the K bit block group(s); for any given bit block group of the K bit block group(s), when one of the K bit(s) corresponding to the given bit block group is unequal to a first value, the given bit block group is not one of the K2 bit block group(s).

In an exemplary embodiment of the above subembodiment, the first value is equal to 1.

In an exemplary embodiment of the above subembodiment, the first value is equal to 0.

In an exemplary embodiment of the above subembodiment, when one of the K bit(s) corresponding to the given bit block group is equal to the first value, the given bit block group is one of the K2 bit block group(s).

In an exemplary embodiment of the above subembodiment, when one of the K bit(s) corresponding to the given bit block group is equal to the first value, the given bit block group is not one of the K2 bit block group(s).

Embodiment 13

Figure 13:
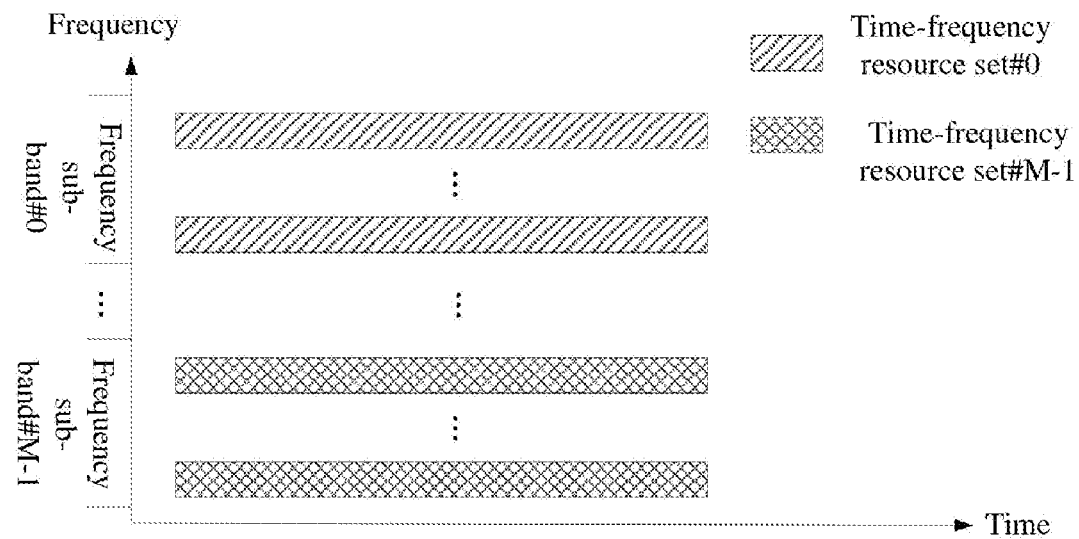
FIG. 13 illustrates a schematic diagram of resource mapping of M time-frequency resource set(s) into M frequency sub-band(s) according to one embodiment of the present disclosure.

Embodiment 13 illustrates a schematic diagram of resource mapping of M time-frequency resource set(s) into M frequency sub-band(s); as shown in FIG. 13. In Embodiment 13, the M time-frequency resource set(s) respectively belongs(belong) to the M frequency sub-band(s) in frequency domain. In FIG. 13, index(indices) of the M time-frequency resource set(s) and the M frequency sub-band(s) is(are) #0, . . . , and #M-1, respectively.

In one embodiment, the M time-frequency resource set(s) is(are) reserved for the first TB in the present disclosure.

In one embodiment, the M time-frequency resource set(s) is(are) reserved for transmission of the first TB in the present disclosure.

In one embodiment, the M time-frequency resource set(s) is(are) reserved for the K bit block group(s) in the present disclosure.

In one embodiment, the M time-frequency resource set(s) is(are) reserved for transmission of the K bit block group(s) in the present disclosure.

In one embodiment, any of the M time-frequency resource set(s) comprises a positive integer number of REs.

In one embodiment, one RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, any of the M time-frequency resource set(s) comprises a positive integer number of multicarrier symbol(s) in time domain.

In one embodiment, any of the M time-frequency resource set(s) comprises a positive integer number of consecutive multicarrier symbols in time domain.

In one embodiment, any of the M time-frequency resource set(s) comprises a positive integer number of subcarrier(s) in frequency domain.

In one embodiment, any of the M time-frequency resource set(s) comprises a positive integer number of non-consecutive subcarriers in frequency domain.

In one embodiment, any of the M time-frequency resource set(s) comprises a positive integer number of PRB(s) in frequency domain.

In one embodiment, any of the M time-frequency resource set(s) comprises a positive integer number of non-consecutive PRBs in frequency domain.

In one embodiment, any of the M time-frequency resource set(s) comprises a positive integer number of interlace(s) in frequency domain.

In one embodiment, any two of the M time-frequency resource sets occupy equal numbers of multicarrier symbols in time domain.

In one embodiment, any two of the M time-frequency resource sets occupy same time domain resources.

In one embodiment, any two of the M time-frequency resource sets occupy equal numbers of subcarriers in frequency domain.

In one embodiment, at least two of the M time-frequency resource sets occupy different numbers of subcarriers in frequency domain.

In one embodiment, any two of the M time-frequency resource sets occupy same numbers of REs.

In one embodiment, at least two of the M time-frequency resource sets occupy different numbers of REs.

In one embodiment, any of the M time-frequency resource set(s) does not comprise REs occupied by reference signals.

In one subembodiment of the above embodiment, the reference signals include one or more of Synchronization Signal/Physical Broadcast Channel block (SS/PBCH block), Channel-State Information Reference Signals (CSI-RS), DMRS, Sounding Reference Signal (SRS), Common Reference Signal (CRS), Phase error Tracking Reference Signals (PTRS), and finetime/frequency Tracking Reference Signals (TRS).

In one embodiment, any of the M time-frequency resource set(s) does not comprise a RE not available for PDSCH, the first node in the present disclosure is a base station, the second node in the present disclosure is a UE.

In one subembodiment, the RE not available for PDSCH is indicated by a higher layer signaling.

In one subembodiment, the RE not available for PDSCH is indicated by an RRC signaling.

In one subembodiment, the RE not available for PDSCH is indicated by RateMatchPattern IE.

In one subembodiment of the above embodiment, the RE not available for PDSCH is indicated by a RateMatchPattern IE configured in a rateMatchPatternToAddModList field.

In one subembodiment of the above embodiment, the RE not available for PDSCH is indicated by a RateMatchPattern IE configured in a rateMatchPatternToAddModList field of a PDSCH-Config IE.

In one subembodiment of the above embodiment, the RE not available for PDSCH is indicated by a RateMatchPattern IE configured in a rateMatchPatternToAddModList field of a ServingCellConfigCommon IE.

In one embodiment, any of the M time-frequency resource set(s) does not comprise a RE not available for PUSCH, the first node in the present disclosure is a UE, the second node in the present disclosure is a base station.

In one embodiment, any of the M time-frequency resource set(s) does not comprise a RE(s) occupied by a Physical Random Access Channel (PRACH).

Embodiment 14

Figure 14:
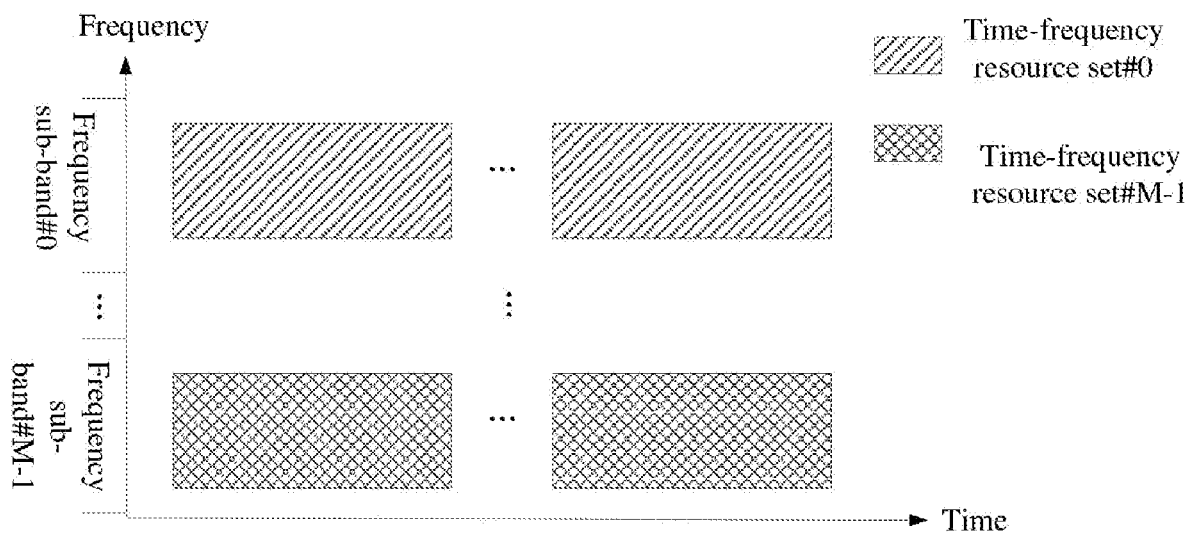
FIG. 14 illustrates a schematic diagram of resource mapping of M time-frequency resource set(s) into M frequency sub-band(s) according to one embodiment of the present disclosure.

Embodiment 14 illustrates a schematic diagram of resource mapping of M time-frequency resource set(s) into M frequency sub-band(s); as shown in FIG. 14. In FIG. 14, index(indices) of the M time-frequency resource set(s) and the M frequency sub-band(s) is(are) #0, . . . , and #M-1, respectively.

In one embodiment, any of the M time-frequency resource set(s) comprises a positive integer number of non-consecutive multicarrier symbols in time domain.

In one embodiment, any of the M time-frequency resource set(s) comprises a positive integer number of consecutive subcarriers in frequency domain.

In one embodiment, any of the M time-frequency resource set(s) comprises a positive integer number of consecutive PRB s in frequency domain.

Embodiment 15

Figure 15:
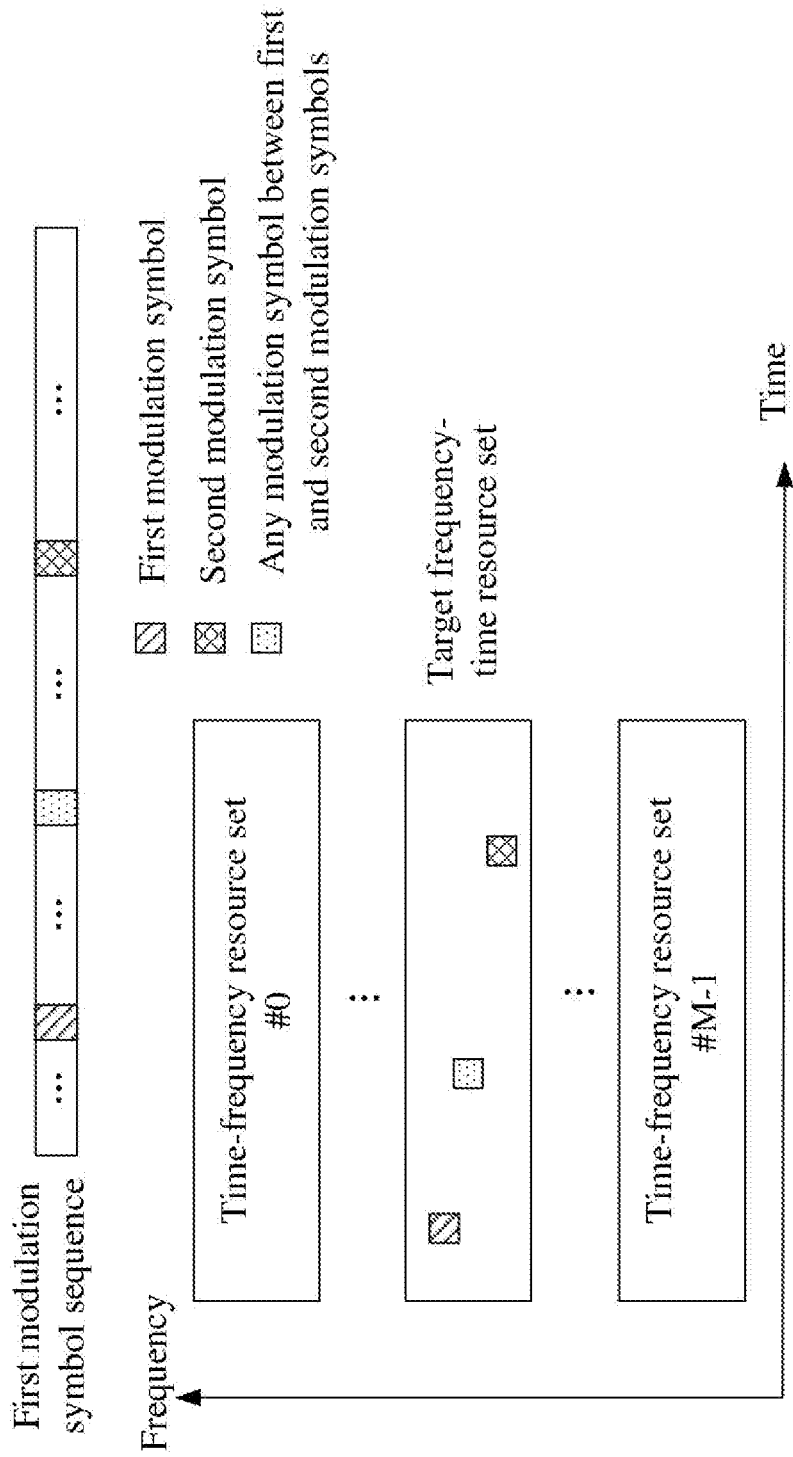
FIG. 15 illustrates a schematic diagram of resource mappings of a first modulation symbol, a second modulation symbol and any modulation symbol of a first modulation symbol sequence located between the first modulation symbol and the second modulation symbol into a target time-frequency resource set according to one embodiment of the present disclosure.

Embodiment 15 illustrates a schematic diagram of resource mappings of a first modulation symbol, a second modulation symbol and any modulation symbol in a first modulation symbol sequence located between the first modulation symbol and the second modulation symbol into a target time-frequency resource set; as shown in FIG. 15. In Embodiment 15, the K bit block group(s) in the present disclosure is(are) used for generating the first modulation symbol sequence, the first modulation symbol sequence is mapped into M time-frequency resource set(s) in the present disclosure, the M time-frequency resource set(s) respectively belongs(belong) to the M frequency sub-band(s) in the present disclosure. The first modulation symbol and the second modulation symbol are any two modulation symbols of the first modulation symbol sequence mapped into the target time-frequency resource set of the M time-frequency resource set(s). Any modulation symbol in the first modulation symbol sequence located between the first modulation symbol and the second modulation symbol is mapped into the target time-frequency resource set. In FIG. 15, index (indices) of the M time-frequency resource set(s) is(are) #0, . . . , and #M-1, respectively.

In one embodiment, the first modulation symbol sequence comprises a positive integer number of modulation symbols.

In one embodiment, all modulation symbols in the first modulation symbol sequence are sequentially arranged.

In one embodiment, all modulation symbols in the first modulation symbol sequence correspond to a same modulation order.

In one embodiment, all modulation symbols in the first modulation symbol sequence correspond to a same modulation scheme, that is, a modulation scheme out of $\pi/2$-BPSK, BPSK, QPSK, 16 QAM, 64 QAM and 256 QAM.

In one embodiment, the target time-frequency resource set is any of the M time-frequency resource set(s).

In one embodiment, the phrase that the K bit block group(s) is(are) used for generating a first modulation symbol sequence includes: The K bit block group(s) comprises (comprise) T code block(s), the T is a positive integer; bits in the T code block(s) are respectively subjected to code block-level CRC Attachment, channel coding and rate matching in sequence to acquire T post-coding bit string(s); the first modulation symbol sequence is an output after the T post-coding bit string(s) is(are) sequentially subjected to concatenation, scrambling and a modulation mapper.

In one embodiment, all modulation symbols in the first modulation symbol sequence are sequentially subjected to a mapper layer, a transform precoder, precoding and a resource element mapper and then are mapped into the M time-frequency resource set(s).

In one embodiment, all modulation symbols in the first modulation symbol sequence are sequentially subjected to a mapper layer, precoding and a resource element mapper and then are mapped into the M time-frequency resource set(s).

In one embodiment, the first modulation symbol sequence comprises B1 modulation symbol(s), the B1 modulation symbol(s) is(are) respectively mapped into B1 RE(s), the B1 is a positive integer.

In one embodiment, there is(are) B3 modulation symbol(s) in the first modulation symbol sequence, the position of a frequency sub-band to which an RE mapped by any of the B3 modulation symbol(s) belongs in the M frequency sub-bands is related to the number of multicarrier symbols occupied by at least one of the M time-frequency resource sets in time domain; the B3 is a positive integer less than the number of modulation symbols comprised in the first modulation symbol sequence.

In one subembodiment, the B3 is greater than 1.

In one subembodiment, the B3 is a difference between the number of modulation symbols comprised in the first modulation symbol sequence and the number of subcarriers occupied by a first reference time-frequency resource set in frequency domain; a frequency sub-band to which the first reference time-frequency resource set belongs is lower than any other frequency sub-band of the M frequency sub-bands other than the frequency sub-band to which the first reference time-frequency resource set belongs.

In an exemplary embodiment of the above subembodiment, the phrase that the number of subcarriers occupied by a first reference time-frequency resource set in frequency domain refers to the number of subcarriers occupied by the first reference time-frequency resource set within an earliest multicarrier symbol occupied by the first reference time-frequency resource set.

In an exemplary embodiment of the above subembodiment, the phrase that the number of subcarriers occupied by a first reference time-frequency resource set in frequency domain refers to the number of subcarriers occupied by the first reference time-frequency resource set within an earliest multicarrier symbol not comprising reference signals occupied by the first reference time-frequency resource set.

In one embodiment, a first given frequency sub-band being lower than a second given frequency sub-band includes: a third modulation symbol is any modulation symbol in the first modulation symbol sequence mapped into the first given frequency sub-band, a fourth modulation symbol is any modulation symbol in the first modulation symbol sequence mapped into the second given frequency sub-band; the third modulation symbol is located before the fourth modulation symbol in the first modulation symbol.

In one embodiment, a first given frequency sub-band being lower than a second given frequency sub-band includes: a highest frequency point of the first given frequency sub-band is lower than a latest frequency point of the second given frequency sub-band.

In one embodiment, a first given frequency sub-band being lower than a second given frequency sub-band includes: an index of the first given frequency sub-band is less than an index of the second given frequency sub-band.

In one embodiment, a first given frequency sub-band being lower than a second given frequency sub-band includes: an index of a subcarrier having a maximum index occupied by the first given frequency sub-band is less than an index of a subcarrier having a minimum index occupied by the second given frequency sub-band.

In one embodiment, the first modulation symbol sequence is mapped into L layers of the M time-frequency resource set(s), the L is a positive integer greater than 1. A third modulation symbol and a fourth modulation symbol are any two modulation symbols in the first modulation symbol sequence mapped into different layers of a reference subcarrier within a reference multicarrier symbol occupied by a second reference time-frequency resource set. The second reference time-frequency resource set is any of the M time-frequency resource set(s), the reference multicarrier symbol is any multicarrier symbol within the second reference time-frequency resource set, the reference subcarrier is any subcarrier within the second reference time-frequency resource set. Modulation symbols in the first modulation symbol sequence located between the third modulation symbol and the fourth modulation symbol are all mapped into the reference subcarrier within the reference multicarrier symbol occupied by the second reference time-frequency resource set.

In one embodiment, a third modulation symbol and a fourth modulation symbol are any two modulation symbols in the first modulation symbol sequence mapped into different subcarriers within a reference multicarrier symbol occupied by a second reference time-frequency resource set. The second reference time-frequency resource set is any of the M time-frequency resource set(s), the reference multicarrier symbol is any multicarrier symbol within the second reference time-frequency resource set. Modulation symbols in the first modulation symbol sequence located between the third modulation symbol and the fourth modulation symbol are all mapped into the reference multicarrier symbol occupied by the second reference time-frequency resource set.

In one embodiment, the first modulation symbol sequence is mapped into L layers of the M time-frequency resource set(s), the L is a positive integer. A third modulation symbol and a fourth modulation symbol are any two modulation symbols in the first modulation symbol sequence, the third modulation symbol is located before the fourth modulation symbol in the first modulation symbol sequence. If the third modulation symbol and the fourth modulation symbol are mapped into a same subcarrier within a same multicarrier symbol occupied by a same time-frequency resource set of the M time-frequency resource set(s), then an index of the layer mapped by the third modulation symbol is less than an index of the layer mapped by the fourth modulation symbol; if the third modulation symbol and the fourth modulation symbol are mapped into different subcarriers within a same multicarrier symbol occupied by a same time-frequency resource set of the M time-frequency resource set(s), then a subcarrier mapped by the third modulation symbol is lower than a subcarrier mapped by the fourth modulation symbol; if the third modulation symbol and the fourth modulation symbol are mapped into different multicarrier symbols occupied by a same time-frequency resource set of the M time-frequency resource set(s), then a multicarrier symbol mapped by the third modulation symbol is previous to a multicarrier symbol mapped by the fourth modulation symbol; if the third modulation symbol and the fourth modulation symbol are mapped into different time-frequency resource sets of the M time-frequency resource sets, then a frequency sub-band to which a time-frequency resource set mapped by the third modulation symbol belongs is lower than a frequency sub-band to which a time-frequency resource set mapped by the fourth modulation symbol belongs.

In one embodiment, a first given subcarrier being lower than a second given subcarrier includes: an index of the first given subcarrier is smaller than an index of the second given sub carrier.

In one embodiment, a first given subcarrier being lower than a second given subcarrier includes: a frequency point of the first given subcarrier is lower than a frequency point of the second given subcarrier.

Embodiment 16

Figure 16:
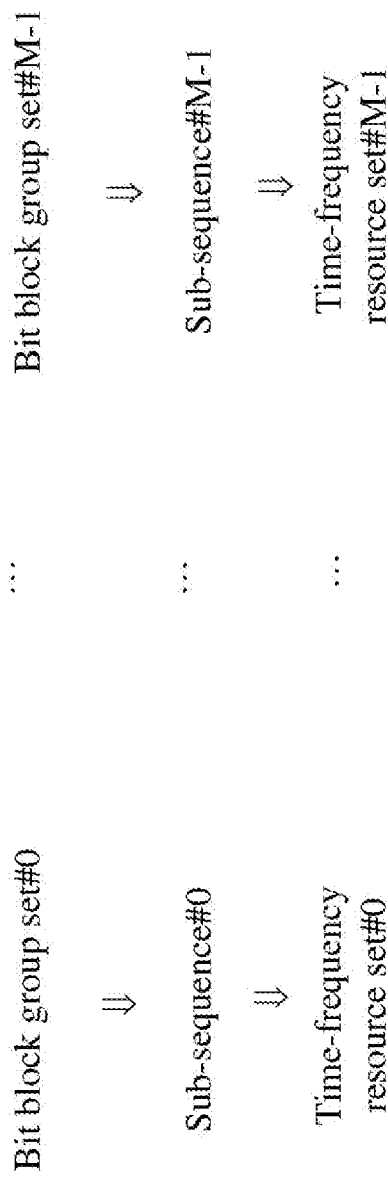
FIG. 16 illustrates a schematic diagram of M bit block group set(s), M sub-sequence(s) and M time-frequency resource set(s) according to one embodiment of the present disclosure.

Embodiment 16 illustrates a schematic diagram of M bit block group set(s), M sub-sequence(s) and M time-frequency resource set(s); as shown in FIG. 16. In Embodiment 16, the first modulation symbol sequence comprises M sub-sequence(s), the M sub-sequence(s) is(are) respectively mapped into the M time-frequency resource set(s); the K bit block group(s) of the present disclosure is(are) divided into the M bit block group set(s), the M bit block group set(s) is(are) respectively used for generating the M sub-sequence (s). In FIG. 16, index(indices) of the M bit block group set(s), the M sub-sequence(s) and the M time-frequency resource set(s) is(are) #0, . . . , and #M-1, respectively.

In one embodiment, for any given sub-sequence of the M sub-sequences, any modulation symbol in the given sub-sequence is not mapped into any of the M time-frequency resource set other than the time-frequency resource set corresponding to the given sub-sequence.

In one embodiment, the first modulation symbol sequence is composed of the M sub-sequence(s).

In one embodiment, any of the M sub-sequence(s) comprises a positive integer number of modulation symbol(s) in the first modulation symbol sequence.

In one embodiment, any of the M sub-sequence(s) is composed of a positive integer number of modulation symbol(s) in the first modulation symbol sequence.

In one embodiment, any two of the M sub-sequences comprise equal numbers of modulation symbols.

In one embodiment, at least two of the M sub-sequences comprise unequal numbers of modulation symbols.

In one embodiment, the number of modulation symbols comprised by any of the M sub-sequence(s) is equal to the number of REs occupied by a corresponding time-frequency resource set.

In one embodiment, for any given time-frequency resource set of the M time-frequency resource set(s), the number of REs comprised by the given time-frequency resource set is used for determining the code rate of each code block in one of the M bit block group set(s) corresponding to the given time-frequency resource set.

In one embodiment, for any given time-frequency resource set of the M time-frequency resource set(s), the number of REs comprised by the given time-frequency resource set is used for determining the outputted bit number of Rate Matching for each code block in one of the M bit block group set(s) corresponding to the given time-frequency resource set.

In one embodiment, any of the M bit block group set(s) is composed of a positive integer number of bit block group(s) of the K bit block group(s).

In one embodiment, any of the K bit block group(s) belongs to one of the M bit block group set(s).

In one embodiment, there is not any of the K bit block group(s) simultaneously belonging to two different bit block group sets of the M bit block group sets.

In one embodiment, any two of the M bit block group sets comprise equal numbers of bit block groups.

In one embodiment, at least two of the M bit block groups sets comprise unequal numbers of bit block groups.

In one embodiment, the phrase that the M bit block group set(s) is(are) respectively used for generating the M sub-sequence(s) includes: for any of the M given bit block group set(s), the given bit block group set comprises T2 code block(s), the T2 is a positive integer; bits in the T2 code block(s) are respectively subjected to code block-level CRC Attachment, channel coding and rate matching in sequence to acquire T2 post-coding bit string(s); one of the M sub-sequence(s) corresponding to the given bit block group set is an output after the T2 post-coding bit string(s) is(are) sequentially subjected to Concatenation, scrambling and a modulation mapper.

In one embodiment, any given sub-sequence of the M sub-sequences is irrelevant to any code block in any bit block group set of the M bit block group sets other than the bit block group set corresponding to the given sub-sequence.

In one embodiment, for any given sub-sequence of the M sub-sequences, all modulation symbols in the given sub-sequence are sequentially subjected to a layer mapper, a transform precoder, precoding and a resource element mapper and then are mapped into one of the M time-frequency resource sets corresponding to the given sub-sequence.

In one embodiment, for any given sub-sequence of the M sub-sequences, all modulation symbols in the given sub-sequence are sequentially subjected to a layer mapper, precoding and a resource element mapper and then are mapped into one of the M time-frequency resource sets corresponding to the given sub-sequence.

In one embodiment, any of the K1 bit block group(s) in the present disclosure belongs to one of M1 bit block group set(s), the M1 bit block group set(s) is(are) bit block group set(s) of the M bit block group set(s) respectively used for generating M1 sub-sequence(s), the M1 sub-sequence(s) is(are) respectively mapped into M1 time-frequency resource set(s), the M1 time-frequency resource set(s) is(are) time-frequency resource set(s) out of the M time-frequency resource set(s) respectively belonging to the M1 frequency sub-band(s) in the present disclosure.

In one subembodiment, the K1 bit block group(s) comprises(comprise) all bit block group(s) in the M1 bit block group set(s).

In one subembodiment, the K1 bit block group(s) is(are) composed of all bit block group(s) in the M1 bit block group set(s).

Embodiment 17

Figure 17:
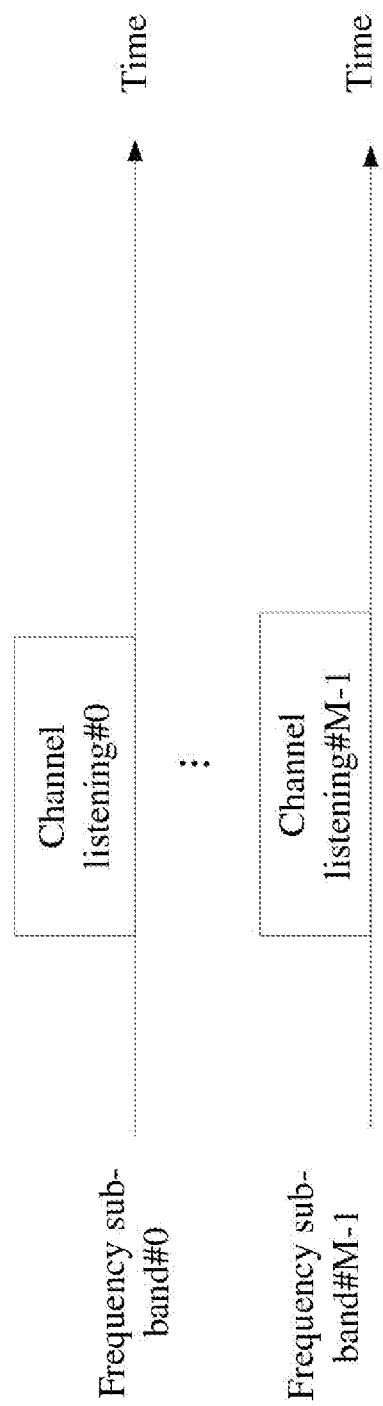
FIG. 17 illustrates a schematic diagram of M channel listening(s) according to one embodiment of the present disclosure.

Embodiment 17 illustrates a schematic diagram of M channel listening(s); as shown in FIG. 17. In Embodiment 17, the M channel listening(s) is(are) respectively performed on the M frequency sub-band(s) of the present disclosure. The M channel listening(s) is(are) performed separately. In FIG. 17, index(indices) of the M frequency sub-band(s) and the M channel listening(s) is(are) #0, . . . , and #M-1, respectively.

In one embodiment, the M channel listening(s) is(are) respectively used for determining whether the M frequency sub-band(s) can be used for radio signal transmission.

In one embodiment, the M channel listening(s) is(are) respectively used for determining whether the M frequency sub-band(s) is(are) idle.

In one embodiment, the M channel listenings are used for determining that the first radio signal can be transmitted in only the M1 frequency sub-band(s) of the M frequency sub-bands.

In one embodiment, the M channel listenings are used for determining to drop transmitting a radio signal in any of the M frequency sub-bands other than the M1 frequency sub-band(s).

In one embodiment, M1 of the M channel listening(s) is(are) respectively used for determining that the M1 frequency sub-band(s) can be used for transmitting a radio signal, the M1 channel listening(s) is(are) respectively performed in the M1 frequency sub-band(s).

In one embodiment, M1 of the M channel listening(s) is(are) respectively used for determining that the M1 frequency sub-band(s) is(are) idle, the M1 channel listening(s) is(are) respectively performed in the M1 frequency sub-band(s).

In one embodiment, M-M1 channel listening(s) of the M channel listenings is(are) respectively used for determining that M-M1 frequency sub-band(s) cannot be used for transmitting a radio signal; the M-M1 channel listening(s) is(are) respectively performed in the M-M1 frequency sub-band(s), the M-M1 frequency sub-band(s) is(are) composed of all frequency sub-band(s) of the M frequency sub-bands not belonging to the M1 frequency sub-band(s).

In one embodiment, M-M1 channel listening(s) of the M channel listenings is(are) respectively used for determining that M-M1 frequency sub-band(s) is(are) not idle; the M-M1 channel listening(s) is(are) respectively performed in the M-M1 frequency sub-band(s), the M-M1 frequency sub-band(s) is(are) composed of all frequency sub-band(s) of the M frequency sub-bands not belonging to the M1 frequency sub-band(s).

In one embodiment, any of the M channel listening(s) is LBT.

In one embodiment, the specific definition and implementation of the LBT can be found in 3GPP TR36.889.

In one embodiment, any of the M channel listening(s) is Clear Channel Assessment (CCA).

In one embodiment, the specific definition and implementation of the CCA can be found in 3GPP TR36.889.

In one embodiment, any of the M channel listening(s) is realized through the manner prescribed in 3GPP TS36.213, section 15.

In one embodiment, any of the M channel listening(s) is Category 4 LBT.

In one embodiment, at least one of the M channel listenings is Category 4 LBT.

In one embodiment, any of the M channel listening(s) is Category 2 LBT.

In one embodiment, at least one of the M channel listenings is Category 2 LBT.

In one embodiment, the specific definition and implementation of the Category 4 LBT can be found in 3GPP TR36.889.

In one embodiment, the specific definition and implementation of the Category 2 LBT can be found in 3GPP TR36.889.

In one embodiment, any of the M channel listening(s) is sub-band LBT.

In one embodiment, any of the M channel listening(s) is performed in a 20 MHz frequency band.

In one embodiment, any of the M channel listening(s) is performed in a unit of 20 MHz bandwidth in frequency domain.

In one embodiment, any two of the M channel listenings end at the same time.

In one embodiment, at least two of the M channel listenings start at the same time.

In one embodiment, at least two of the M channel listenings start at different times.

In one embodiment, any two of the M channel listenings correspond to separate counters N, for the specific meaning of the counter N, refer to 3GPP TS36.213 (V14.1.0), section 15.1.1.

In one embodiment, at least two of the M channel listenings correspond to unequal counters N.

In one embodiment, when the first node in the present disclosure ceases transmitting in any given frequency sub-band of the M frequency sub-bands, for any given channel listening of the M channel listenings other than the channel listening for the given frequency sub-band, the first node, after waiting for $4T_{sl}$ or initializing the counter N for the given channel listening, will continue to reduce the counter N for the given channel listening when detecting an idle slot.

In one embodiment, a counter N for any of the M channel listenings is equal to a reference counter, the reference counter is a counter N for one of the M channel listenings corresponding to a frequency sub-band with a largest CWp value out of the M frequency sub-bands.

In one embodiment, the CWp is the size of a contention window, for the specific definition of the CWp, refer to 3GPP TS36.213, section 15.

In one embodiment, when the first node in the present disclosure ceases transmitting in any given frequency sub-band of the M frequency sub-bands, the first node reinitializes counters N for all of the M channel listenings.

In one embodiment, the M frequency sub-bands have a same CWp.

In one embodiment, the M frequency sub-bands correspond to separate CWps.

In one embodiment, any of the M channel listenings ends no later than when time domain resources occupied by the first radio signal of the present disclosure start.

Embodiment 18

Figure 18:
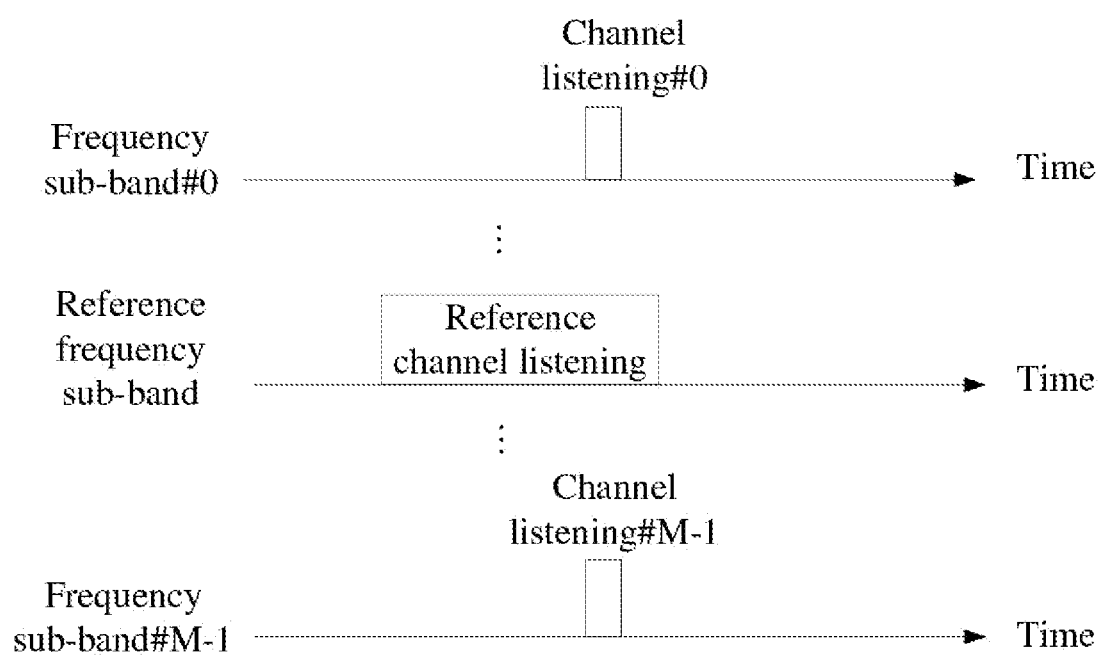
FIG. 18 illustrates a schematic diagram of M channel listening(s) according to one embodiment of the present disclosure.

Embodiment 18 illustrates a schematic diagram of M channel listening(s); as shown in FIG. 18.

In Embodiment 18, whether any of the M frequency sub-bands can be used for transmitting a radio signal depends on a reference channel listening, the reference channel listening is one of the M channel listenings corresponding to a reference frequency sub-band, the reference sub-band is one of the M frequency sub-bands.

In one embodiment, among the M channel listenings only one channel listening is Category 4 LBT.

In one embodiment, the reference channel listening is Category 4 LBT.

In one embodiment, M-1 channel listening(s) of the M channel listenings is(are) Category 2 LBT.

In one embodiment, any of the M channel listenings other than the reference channel listening is Category 2 LBT.

In one embodiment, there is at least one given frequency sub-band in the M frequency sub-bands, whether the given frequency sub-band can be used for transmitting a radio signal is related to one of the M channel listenings other than a channel listening for the given frequency sub-band.

In one embodiment, whether the reference frequency sub-band can be used for transmitting a radio signal is only relevant to the reference channel listening of the M channel listenings.

In one embodiment, if the reference channel listening determines that the reference frequency sub-band is idle, the reference frequency sub-band can be used for transmitting a radio signal; if the reference channel listening determines that the reference frequency sub-band is not idle, the reference frequency sub-band cannot be used for transmitting radio signal.

In one embodiment, for any given frequency sub-band of the M frequency sub-bands other than the reference frequency sub-band, the reference channel listening and a channel listening for the given frequency sub-band are together used for determining whether the given frequency sub-band can be used for transmitting a radio signal.

In one embodiment, for any given frequency sub-band of the M frequency sub-bands other than the reference frequency sub-band, when the reference channel listening determines that the reference frequency sub-band is idle, and a channel listening for the given frequency sub-band determines that the given frequency sub-band is idle, the given frequency sub-band can be used for transmitting a radio signal.

In one embodiment, for any given frequency sub-band of the M frequency sub-bands other than the reference frequency sub-band, when the reference channel listening determines that the reference frequency sub-band is not idle, the given frequency sub-band cannot be used for transmitting a radio signal.

In one embodiment, for any given frequency sub-band of the M frequency sub-bands other than the reference frequency sub-band, when the reference channel listening determines that the reference frequency sub-band can be used for transmitting a radio signal, and a channel listening for the given frequency sub-band determines that the given frequency sub-band is idle within 25 μs before the reference frequency sub-band transmits a radio signal, the given frequency sub-band can be used for transmitting a radio signal.

In one embodiment, for any given frequency sub-band of the M frequency sub-bands other than the reference frequency sub-band, when a channel listening for the given frequency sub-band determines that the given frequency sub-band is not idle, the given frequency sub-band cannot be used for transmitting a radio signal.

In one embodiment, for any given frequency sub-band of the M frequency sub-bands other than the reference frequency sub-band, when a channel listening for the given frequency sub-band determined that the given frequency sub-band is not idle within 25 μs before the reference frequency sub-band transmits a radio signal, the given frequency sub-band cannot be used for transmitting a radio signal.

In one embodiment, the reference frequency sub-band is chosen at random from the M frequency sub-bands.

In one embodiment, the probability of any of the M frequency sub-bands to be chosen as the reference frequency sub-band is constant.

In one embodiment, any of the M frequency sub-bands won't be repeatedly chosen as the reference frequency sub-band in a second.

Embodiment 19

Figure 19:
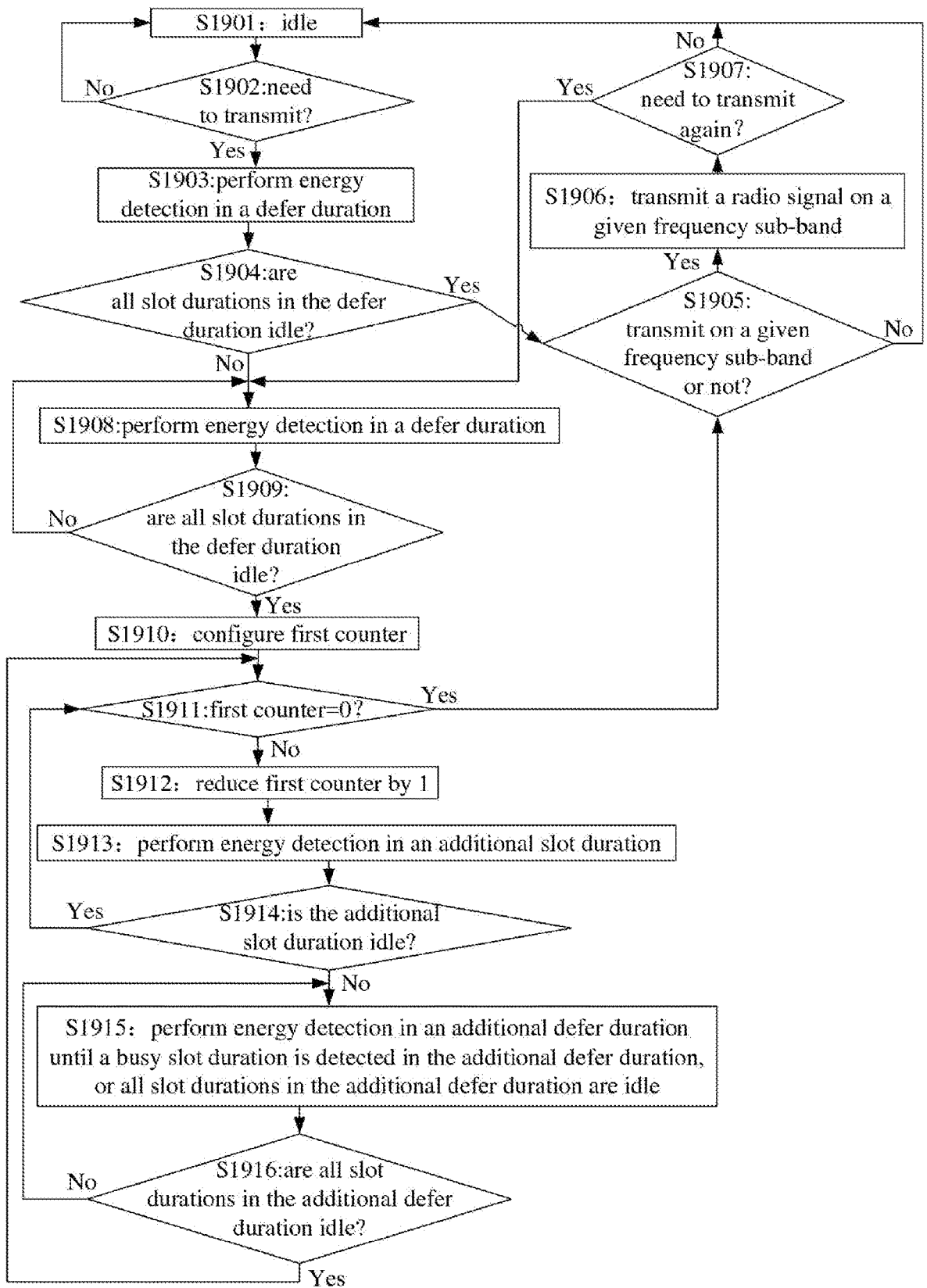
FIG. 19 illustrates a flowchart of a given channel listening of M channel listening(s) according to one embodiment of the present disclosure.

Embodiment 19 illustrates a flowchart of a given channel listening of M channel listening(s); as shown in FIG. 19.

In Embodiment 19, the given channel listening is one of the M channel listening(s), the given channel listening is performed in a given frequency sub-band of the M frequency sub-band(s) in the present disclosure. The process of performing the given channel listening is described by the flowchart in FIG. 19. The first node in the present disclosure is idle in step S1901, and determines whether to transmit or not in step S1902, if yes, move forward to step S1903, otherwise go back to step S1901; the first node then performs energy detection in a defer duration of the given frequency sub-band in step S1903; and determines whether all slot durations within the defer duration are idle in step S1904, if yes, move forward to step 1905, otherwise move forward to step S1908; determines whether to transmit in the given frequency sub-band in step S1905, if yes, move forward to step S1906, otherwise go back to step S1901; transmits a radio signal in the given frequency sub-band in step S1906; and determines whether to transmit again or not in step S1907, if yes, move forward to step S1908, otherwise go back to step S1901; the first node performs energy detection in a defer duration of the given frequency sub-band in step S1908; and determines whether all slot durations in the defer duration are idle in step S1909, if yes, move forward to step S1910, otherwise go back to step S1908; configures a first counter in step S1910; and determines in step S1911 whether the first counter is 0, if yes, go back to step S1905, otherwise move forward to step S1912; reduces the first counter by 1 in step S1912; performs energy detection in an additional slot duration of the given frequency sub-band in step S1913; and determines whether the additional slot duration is idle in step S1914, if yes, go back to step S1911, otherwise move forward to step S1915; the first node performs energy detection in an additional defer duration of the given frequency sub-band in step S1915 till a busy slot duration is detected, or all slot durations within the additional defer duration are idle; and determines in step S1916 whether all slot durations in the additional defer duration are idle, if yes, go back to step S1911, otherwise go back to step S1915.

In one embodiment, the specific meaning of the defer duration, the slot duration, the additional slot duration and the additional defer duration in FIG. 19 can be found in 3GPP TS36.213, section 15.

In one embodiment, performing energy detection within a given duration refers to performing energy detection in all slot durations within the given duration; the given duration is any duration of all defer durations in step S1903 and step S1908, all additional slot durations in step S1913, and all additional defer durations in step S1915 of FIG. 19.

In one embodiment, performing energy detection within a slot duration refers to sensing the power of a radio signal in a given time unit and averaging in time; if a received power acquired herein is lower than a reference threshold, then it is determined that the slot duration is idle, if the received power acquired herein is not lower than the reference threshold, then it is determined that the slot duration is not idle; the given time unit is a persistent period within the slot duration.

In one embodiment, performing energy detection within a slot duration refers to sensing the energy of a radio signal in a given time unit and averaging in time; if a received energy acquired herein is lower than a reference threshold, then it is determined that the slot duration is idle, if the received energy acquired herein is not lower than the reference threshold, then it is determined that the slot duration is not idle; the given time unit is a persistent period within the slot duration.

In one embodiment, the given time unit lasts no less than 4 μs.

In one embodiment, the time length of a defer duration is 16 μs plus Q1 time(s) as much as 9 μs.

In one subembodiment, the Q1 is one of 1, 2, 3, and 7.

In one embodiment, a defer duration comprises a plurality of slot durations.

In one subembodiment, among the plurality of slot durations a first slot duration and a second slot duration are not consecutive.

In one subembodiment, among the plurality of slot durations a first slot duration and a second slot duration are spaced with a time interval of 7 ms.

In one embodiment, a defer duration lasts as long as an additional defer duration.

In one embodiment, a slot duration lasts 9 μs.

In one embodiment, an additional slot duration lasts as along as a slot duration.

In one embodiment, the value of the first counter is set as one of P1 candidate integers in step S1910.

In one subembodiment, the P1 is one of a collection of 3, 7, 15, 31, 63, 127, 255, 511, and 1023.

In one subembodiment, the P1 is the CWp in Category 4 LBT process.

In one subembodiment, the P1 candidate integers are 0, 1, 2, ..., and P1-1.

In one subembodiment, the first node chooses one of the P1 candidate integers at random as the configured value of the first counter.

In one subembodiment, any two of the P1 candidate integers are equally likely to be selected as the configured value of the first counter.

In one embodiment, the given channel listening is any of the M channel listening(s).

In one embodiment, the given channel listening is the reference channel listening in Embodiment 18.

Embodiment 20

Figure 20:
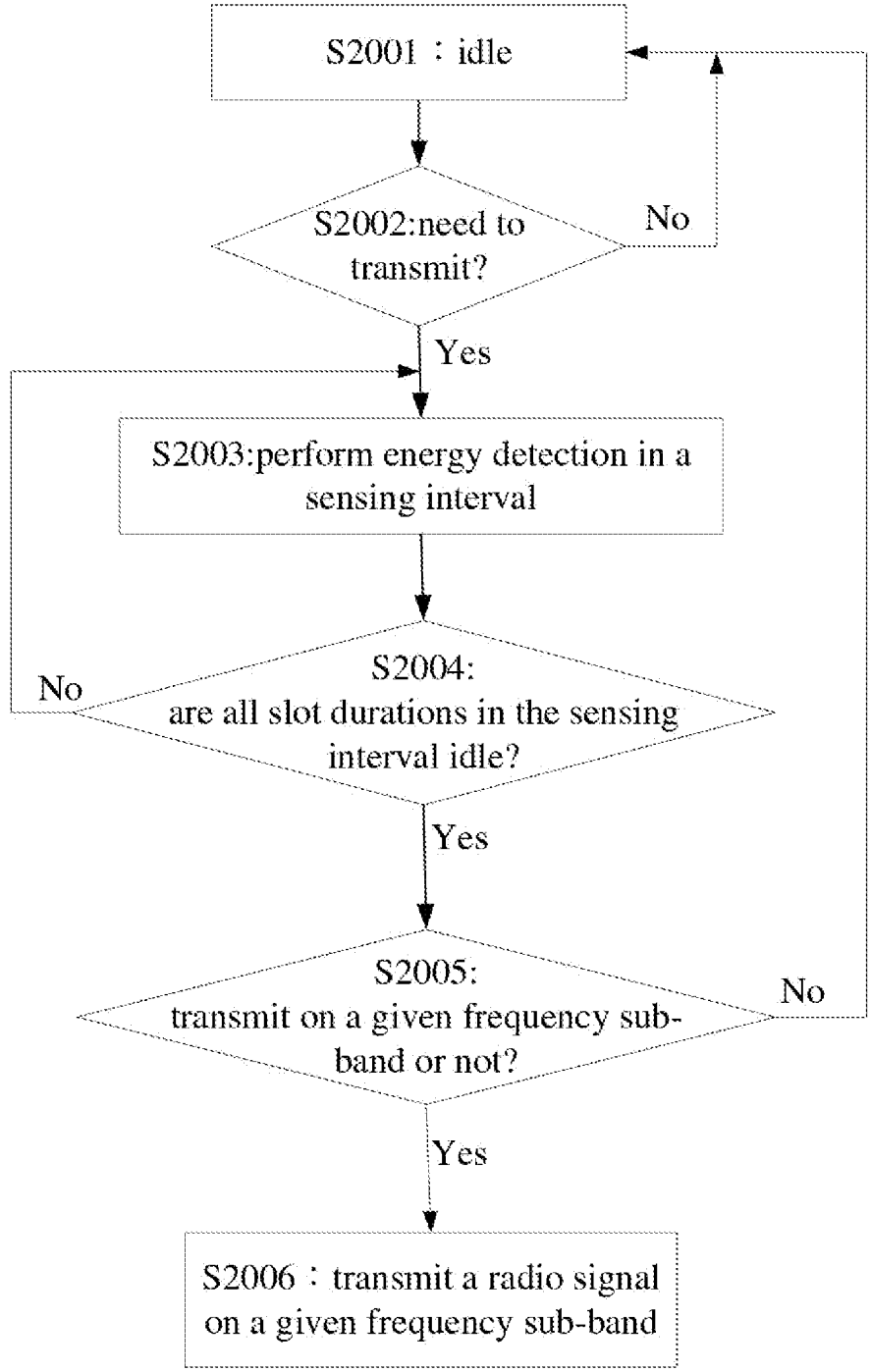
FIG. 20 illustrates a flowchart of a given channel listening of M channel listening(s) according to one embodiment of the present disclosure.

Embodiment 20 illustrates a flowchart of a given channel listening of M channel listening(s); as shown in FIG. 20.

In Embodiment 20, the given channel listening is one of the M channel listening(s), the given channel listening is performed in a given frequency sub-band of the M frequency sub-band(s) in the present disclosure. The process of performing the given channel listening is described as the flowchart in FIG. 20. The first node in the present disclosure is idle in step S2001, and determines whether to transmit or not in step S2002, if yes, move forward to step S2003, otherwise go back to step S2001; performs energy detection in a sensing interval of the given frequency sub-band in step S2003; and determines in step S2004 whether all slot durations in the sensing interval are idle, if yes, move forward to step S2005, otherwise go back to step S2003; determines in step S2005 whether to transmit a radio signal in the given frequency sub-band, if yes, move forward to step S2006, otherwise go back to step S2001; and transmits a radio signal in the given frequency sub-band in step S2006.

In one embodiment, for the specific definition of the sensing interval and the slot duration in FIG. 20, refer to 3GPP TS36.213, section 15.2.

In one embodiment, performing energy detection in a sensing interval refers performing energy detection in all slot durations within the sensing interval.

In one embodiment, a sensing interval lasts 25 μs.

In one embodiment, a sensing interval comprises 2 slot durations, the 2 slot durations are not consecutive in time domain.

In one subembodiment of the above embodiment, the 2 slot durations are spaced by a time interval of 7 μs.

In one embodiment, the given channel listening is any of the M channel listening(s).

In one embodiment, the given channel listening is any of the M channel listenings other than the reference channel listening in Embodiment 18.

Embodiment 21

Embodiment 21 illustrates a schematic diagram of a type of M channel listening(s) being used for determining a mapping mode of the first modulation symbol sequence into the M frequency sub-band(s); as shown in FIG. 21.

In Embodiment 21, the fourth information in the present disclosure is used for determining a type of the M channel listening(s). The K bit block group(s) in the present disclosure is(are) used for generating the first modulation symbol sequence, the first modulation symbol sequence is mapped into the M time-frequency resource set(s) in the present disclosure, the M time-frequency resource set(s) belongs (belong) to the M frequency sub-band(s) respectively in frequency domain.

In one embodiment, the fourth information is carried by a higher layer signaling.

In one embodiment, the fourth information is carried by an RRC signaling.

In one embodiment, the fourth information is carried by a MAC CE signaling.

In one embodiment, the fourth information is carried by a physical layer signaling.

In one embodiment, the fourth information is carried by the first signaling of the present disclosure.

In one embodiment, the fourth information indicates the type of the M channel listening(s).

In one embodiment, the fourth information explicitly indicates the type of the M channel listening(s).

In one embodiment, the fourth information implicitly indicates the type of the M channel listening(s).

In one embodiment, the type of the M channel listenings includes: whether there is a first frequency sub-band in the M frequency sub-bands, and whether the first frequency sub-band is one of the M frequency sub-bands is related to one of the M channel listenings other than the channel listening performed in the first frequency sub-band.

In one embodiment, the type of the M channel listenings includes: a type of each channel listening of the M channel listening(s).

In one embodiment, the type of each of the M channel listening(s) is one of Category 1 LBT, Category 2 LBT and Category 4 LBT.

In one embodiment, the Category 1 LBT means no LBT.

In one embodiment, the mapping mode of the first modulation symbol sequence into the M frequency sub-band(s) includes: a third modulation symbol and a fourth modulation symbol are two modulation symbols in the first modulation symbol sequence, the third modulation symbol and the fourth modulation symbol are both mapped into a third reference time-frequency resource set of the M time-frequency resource sets, wherein whether modulation symbols in the first modulation symbol sequence located between the third modulation symbol and the fourth modulation symbol are mapped into the third reference time-frequency resource set.

In one embodiment, the mapping mode of the first modulation symbol sequence into the M frequency sub-band(s) includes: whether modulation symbols in the first modulation symbol sequence generated by a same bit block group of the K bit block groups are mapped into different frequency sub-bands of the M frequency sub-bands.

In one embodiment, a third reference time-frequency resource set is any of the M time-frequency resource sets; on the condition that whether any given frequency sub-band of the M frequency sub-bands is one of the M1 frequency sub-band(s) is only dependent on the channel listening of the M channel listenings performed in the given frequency sub-band, all modulation symbols in the first modulation symbol sequence located between a third modulation symbol and a fourth modulation symbol are mapped into the third reference time-frequency resource set, wherein the third modulation symbol and the fourth modulation symbol are any two modulation symbols in the first modulation symbol sequence mapped into the third reference time-frequency resource set; otherwise there are a fifth modulation symbol and a sixth modulation symbol in the first modulation symbol sequence, wherein the fifth modulation symbol and the sixth modulation symbol are both mapped into the third reference time-frequency resource set, in the first modulation symbol sequence there is at least one modulation symbol located between the fifth modulation symbol and the sixth modulation symbol being mapped into one of the M time-frequency resource sets other than the third reference time-frequency resource set.

In one embodiment, a third reference time-frequency resource set is any of the M time-frequency resource set(s); when the type of at least one of the M channel listenings is Category 2 LBT or Category 4 LBT, all modulation symbols in the first modulation symbol sequence located between a third modulation symbol and a fourth modulation symbol are mapped into the third reference time-frequency resource set, wherein the third modulation symbol and the fourth modulation symbol are any two modulation symbols in the first modulation symbol sequence mapped into the third reference time-frequency resource set; otherwise there is a fifth modulation symbol and a sixth modulation symbol in the first modulation symbol sequence, wherein the fifth modulation symbol and the sixth modulation symbol are both mapped into the third reference time-frequency resource set, in the first modulation symbol sequence there is at least one modulation symbol located between the fifth modulation symbol and the sixth modulation symbol being mapped into one of the M time-frequency resource sets other than the third reference time-frequency resource set.

In one embodiment, on the condition that whether any given frequency sub-band of the M frequency sub-bands is one of the M1 frequency sub-band(s) is dependent only on the channel listening performed in the given frequency sub-band out of the M channel listenings, modulation symbols in the first modulation symbol sequence generated by a same bit block group of the K bit block groups are mapped into a same frequency sub-band of the M frequency sub-bands; otherwise modulation symbols generated by at least one of the K bit block groups out of the first modulation symbol sequence are mapped into a plurality of frequency sub-bands of the M frequency sub-bands.

In one embodiment, on the condition that the type of at least one of the M channel listenings is Category 2 LBT or Category 4 LBT, modulation symbols in the first modulation symbol sequence generated by a same bit block group of the K bit block groups are mapped into a same frequency sub-band of the M frequency sub-bands; otherwise, modulation symbols generated by at least one of the K bit block groups out of the first modulation symbol sequence are mapped into a plurality of frequency sub-bands of the M frequency sub-bands.

Embodiment 22

Embodiment 22 illustrates a schematic diagram of third information being used for determining M0 frequency sub-band(s); as shown in FIG. 22. In Embodiment 22, any of the M frequency sub-band(s) in the present disclosure is one of the M0 frequency sub-band(s).

In one embodiment, the third information is carried by a higher layer signaling.

In one embodiment, the third information is carried by an RRC signaling.

In one embodiment, the third information is carried by a MAC CE signaling.

In one embodiment, the third information includes part of or all information in BWP-Downlink IE.

In one embodiment, the third information includes part of or all information in BWP-Uplink IE.

In one embodiment, for the specific meaning of the BWP-Downlink IE, refer to 3GPP TS38.331.

In one embodiment, for the specific meaning of the BWP-Uplink IE, refer to 3GPP TS38.331.

In one embodiment, for the specific meaning of the ServingCellConfig IE, refer to 3GPP TS38.331.

In one embodiment, the third information is transmitted in the M frequency sub-band(s).

In one embodiment, the third information is transmitted in a frequency band(s) other than the M frequency sub-band(s).

In one embodiment, the third information is transmitted in a frequency band(s) deployed on Unlicensed Spectrum.

In one embodiment, the third information is transmitted in a frequency band(s) deployed on Licensed Spectrum.

In one embodiment, the third information indicates the M0 frequency sub-band(s).

In one embodiment, the third information explicitly indicates the M0 frequency sub-band(s).

In one embodiment, the third information implicitly indicates the M0 frequency sub-band(s).

In one embodiment, the M0 is equal to the M, the M frequency sub-band(s) refers(refer) to the M0 frequency sub-band(s).

In one embodiment, the M0 is greater than the M, the M frequency sub-band(s) is(are) a subset of the M0 frequency sub-bands.

Embodiment 23

Figure 23:
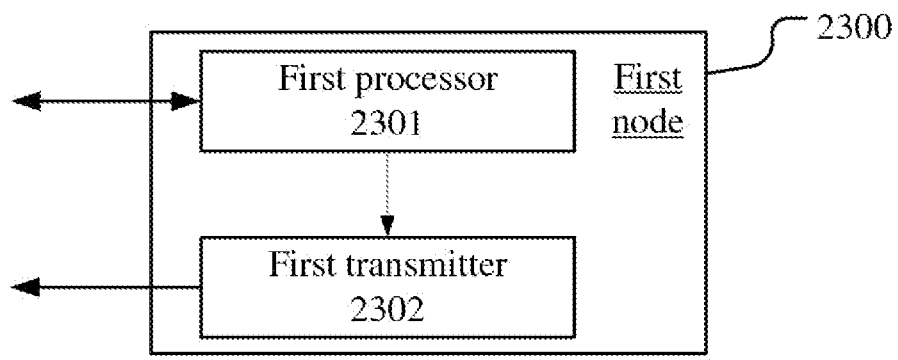
FIG. 23 illustrates a structure block diagram of a processing device in a first node according to one embodiment of the present disclosure.

Embodiment 23 illustrates a structure block diagram of a processing device in a first node; as shown in FIG. 23. In FIG. 23, a processing device 2300 in a first node comprises a first processor 2301 and a first transmitter 2302.

In Embodiment 23, the first processor 2301 operates first information; the first transmitter 2302 transmits a first radio signal in M1 of the M frequency sub-band(s).

In Embodiment 23, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the first node is a base station, the operating action is transmitting; or the first node is a UE, the operating action is receiving.

In one embodiment, the first processor 2301 receives the first information, the first node is a UE.

In one embodiment, the first processor 2301 transmits the first information, the first node is a base station.

In one embodiment, the first processor 2301 also receives a first signaling; a first TB is used for generating the K bit block group(s), the first signaling is used for determining the size of the first TB; the first node is a UE.

In one embodiment, the first processor 2301 also transmits a first signaling; a first TB is used for generating the K bit block group(s), the first signaling is used for determining the size of the first TB; the first node is a base station.

In one embodiment, the first processor 2301 also receives second information; herein, the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

In one embodiment, the first transmitter 2302 also transmits a second radio signal; herein, K2 of the K bit block group(s) is(are) used for generating the second radio signal, the K2 is a positive integer no greater than the K; the first radio signal and the second radio signal belong to a same HARQ process.

In one embodiment, the K bit block group(s) is(are) used for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set.

In one embodiment, the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

In one embodiment, the first processor 2301 also performs M channel listening(s) respectively in the M frequency sub-band(s); herein, the M channel listening(s) is(are) used for determining that the first radio signal can be transmitted in the M1 of the M frequency sub-band(s).

In one embodiment, the first processor 2301 also receives fourth information; herein, the fourth information is used for determining a type of the M channel listening(s); the K bit block group(s) is(are) used for generating a first modulation symbol sequence, the type of the M channel listening(s) is used for determining a mapping mode of the first modulation symbol sequence into the M frequency sub-band(s); the first node is a UE.

In one embodiment, the first processor 2301 also transmits fourth information; herein, the fourth information is used for determining a type of the M channel listening(s); the K bit block group(s) is(are) used for generating a first modulation symbol sequence, the type of the M channel listening(s) is used for determining a mapping mode of the first modulation symbol sequence into the M frequency sub-band(s); the first node is a base station.

In one embodiment, the first processor 2301 also receives third information; herein, the third information is used for determining M0 frequency sub-band(s), any of the M frequency sub-band(s) is one of the M0 frequency sub-band(s); the M0 is a positive integer no less than the M; the first node is a UE.

In one embodiment, the first processor 2301 also transmits third information; herein, the third information is used for determining M0 frequency sub-band(s), any of the M frequency sub-band(s) is one of the M0 frequency sub-band(s); the M0 is a positive integer no less than the M; the first node is a base station.

In one embodiment, the first processor 2301 comprises at least one of the antenna 452, the receiver 453, the receiving processor 456, the channel decoder 458, the controller/processor 459, the memory 460 or the data source 467 in Embodiment 4; the first node is a UE.

In one embodiment, the first processor 2301 comprises at least one of the antenna 420, the transmitter/receiver 418, the transmitting processor 416, the receiving processor 470, the channel encoder 477, the channel decoder 478, the controller/processor 475 or the memory 476 in Embodiment 4; the first node is a base station.

In one embodiment, the first transmitter 2302 comprises at least one of the antenna 452, the transmitter 454, the transmitting processor 468, the channel encoder 457, the controller/processor 459, the memory 460 or the data source 467 in Embodiment 4; the first node is a UE.

In one embodiment, the first transmitter 2302 comprises at least one of the antenna 420, the transmitter 418, the transmitting processor 416, the channel encoder 477, the controller/processor 475 or the memory 476 in Embodiment 4; the first node is a base station.

Embodiment 24

Figure 24:
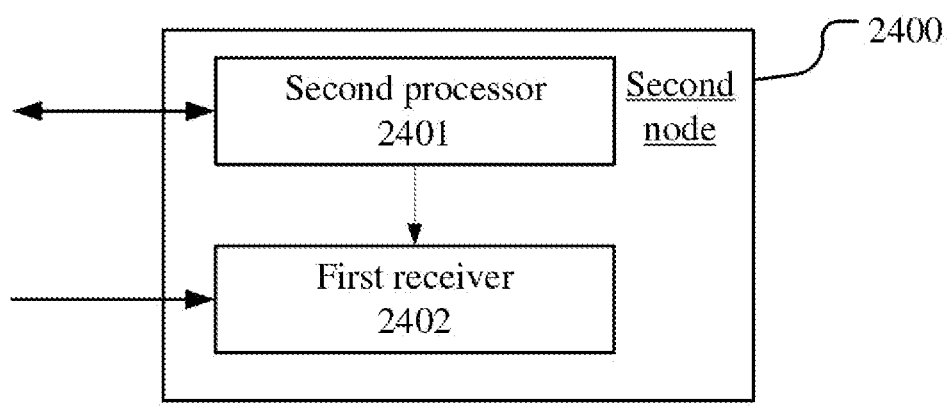
FIG. 24 illustrates a structure block diagram of a processing device in a second node according to one embodiment of the present disclosure.

Embodiment 24 illustrates a structure block diagram of a processing device in a second node; as shown in FIG. 24. In FIG. 24, a processing device 2400 in a second node comprises a second processor 2401 and a first receiver 2402.

In Embodiment 24, the second processor 2401 processes first information; the first receiver 2402 receives a first radio signal in M1 of the M frequency sub-band(s).

In Embodiment 24, the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the second node is a base station, the processing is transmitting; or the second node is a UE, the processing is receiving.

In one embodiment, the second processor 2401 transmits the first information, the second node is a base station.

In one embodiment, the second processor 2401 receives the first information, the second node is a UE.

In one embodiment, the second processor 2401 also transmits a first signaling; a first TB is used for generating the K bit block group(s), the first signaling is used for determining the size of the first TB; the second node is a base station.

In one embodiment, the second processor 2401 also receives a first signaling; a first TB is used for generating the K bit block group(s), the first signaling is used for determining the size of the first TB; the second node is a UE.

In one embodiment, the second processor 2401 also transmits second information; herein, the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

In one embodiment, the first receiver 2402 also receives a second radio signal; herein, K2 of the K bit block group(s) is(are) used for generating the second radio signal, the K2 is a positive integer no greater than the K; the first radio signal and the second radio signal belong to a same HARQ process.

In one embodiment, the K bit block group(s) is(are) used for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set.

In one embodiment, the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

In one embodiment, the first receiver 2402 also monitors the first radio signal respectively in the M frequency sub-band(s), and receives the first radio signal in the M1 frequency sub-band(s).

In one embodiment, the second processor 2401 also transmits fourth information; herein, the fourth information is used for determining a type of the M channel listening(s); the M channel listening(s) is(are) respectively applied to the M frequency sub-band(s), the M channel listening(s) is(are) used for determining that the first radio signal can be transmitted in the M1 of the M frequency sub-band(s); the K bit block group(s) is(are) used for generating a first modulation symbol sequence, the type of the M channel listening(s) is used for determining a mapping mode of the first modulation symbol sequence into the M frequency sub-band(s); the second node is a base station.

In one embodiment, the second processor 2401 also receives fourth information; herein, the fourth information is used for determining a type of the M channel listening(s); the M channel listening(s) is(are) respectively applied to the M frequency sub-band(s), the M channel listening(s) is(are) used for determining that the first radio signal can be transmitted in the M1 of the M frequency sub-band(s); the K bit block group(s) is(are) used for generating a first modulation symbol sequence, the type of the M channel listening(s) is used for determining a mapping mode of the first modulation symbol sequence into the M frequency sub-band(s); the second node is a UE.

In one embodiment, the second processor 2401 also transmits third information; herein, the third information is used for determining M0 frequency sub-band(s), any of the M frequency sub-band(s) is one of the M0 frequency sub-band(s); the M0 is a positive integer no less than the M; the second node is a base station.

In one embodiment, the second processor 2401 also receives third information; herein, the third information is used for determining M0 frequency sub-band(s), any of the M frequency sub-band(s) is one of the M0 frequency sub-band(s); the M0 is a positive integer no less than the M; the second node is a UE.

In one embodiment, the second processor 2401 comprises at least one of the antenna 420, the transmitter 418, the transmitting processor 416, the channel encoder 477, the controller/processor 475 or the memory 476 in Embodiment 4; the second node is a base station.

In one embodiment, the second processor 2401 comprises at least one of the antenna 452, the transmitter/processor 454, the transmitting processor 468, the receiving processor 456, the channel encoder 457, the channel decoder 458, the controller/processor 459, the memory 460 or the data source 467 in Embodiment 4; the second node is a UE.

In one embodiment, the first receiver 2402 comprises at least one of the antenna 420, the receiver 418, the receiving processor 470, the channel decoder 478, the controller/processor 475 or the memory 476 in Embodiment 4; the second node is a base station.

In one embodiment, the first receiver 2402 comprises at least one of the antenna 452, the receiver 454, the receiving processor 456, the channel decoder 458, the controller/processor 459, the memory 460 or the data source 467 in Embodiment 4; the second node is a UE.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
    operating first information; and
    transmitting a first radio signal in M1 of M frequency sub-band(s);
    wherein the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the first node is a base station, the operating is transmitting; or the first node is a UE, the operating is receiving; the K bit block group(s) is(are) used for generating a first modulation symbol sequence, the first modulation symbol sequence is mapped into M time-frequency resource set(s), the M time-frequency resource set(s) belongs (belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set; the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

2. The method according to claim 1, comprising:
    operating a first signaling;
    wherein a first transport block (TB) is used for generating the K bit block group(s), the first signaling is used for determining a size of the first TB; the first node is a base station, the operating is transmitting; or the first node is a UE, the operating is receiving;
    the M1 is less than the M and the K1 is less than the K; the first node transmits the first radio signal only in the M1 of the M frequency sub-bands; among the K bit block groups only the K1 bit block group(s) is(are) used for generating the first radio signal; the M1 is used for determining the K1; a position(s) of the M1 frequency sub-band(s) in the M frequency sub-bands is(are) used for determining the K1 bit block group(s) out of the K bit block groups; all bits comprised in the K bit block groups are used for generating B1 modulation symbols, the B1 modulation symbols are respectively mapped into B1 REs; among REs mapped by the B1 modulation symbols only REs mapped by B2 modulation symbols are located within the M1 frequency sub-band(s) in frequency domain; the K1 bit block group(s) is(are) bit block group(s) of the K bit block groups used for generating the B2 modulation symbols; the B2 is a positive integer, the B1 is a positive integer no less than the B2.

3. The method according to claim 1, comprising:
    transmitting a second radio signal;
    wherein K2 of the K bit block group(s) is(are) used for generating the second radio signal, the K2 is a positive integer no greater than the K; the first radio signal and the second radio signal belong to a same HARQ process;
    or, comprising:
    operating third information;
    wherein the third information is used for determining M0 frequency sub-band(s), any of the M frequency sub-band(s) is one of the M0 frequency sub-band(s); the M0 is a positive integer no less than the M; the first node is a base station, the operating is transmitting; or the first node is a UE, the operating is receiving;
    or, comprising:
    receiving second information; wherein the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

4. The method according to claim 1, wherein
    the first modulation symbol sequence is mapped into L layers of the M time-frequency resource set(s), the L is a positive integer greater than 1; a third modulation symbol and a fourth modulation symbol are any two modulation symbols in the first modulation symbol sequence mapped into different layers of a reference subcarrier within a reference multicarrier symbol occupied by a second reference time-frequency resource set the second reference time-frequency resource set is any of the M time-frequency resource set(s), the reference multicarrier symbol is any multicarrier symbol within the second reference time-frequency resource set, the reference subcarrier is any subcarrier within the second reference time-frequency resource set; modulation symbols in the first modulation symbol sequence located between the third modulation symbol and the fourth modulation symbol are all mapped into the reference subcarrier within the reference multicarrier symbol occupied by the second reference time-frequency resource set; a seventh modulation symbol and an eighth modulation symbol are any two modulation symbols in the first modulation symbol sequence mapped into different subcarriers within the reference multicarrier symbol occupied by the second reference time-frequency resource set; modulation symbols in the first modulation symbol sequence located between the seventh modulation symbol and the eighth modulation symbol are all mapped into the reference multicarrier symbol occupied by the second reference time-frequency resource set.

5. The method according to claim 1, comprising:
performing M channel listening(s) respectively in the M frequency sub-band(s); and
operating fourth information;
wherein the M channel listening(s) is(are) used for determining that the first radio signal can be transmitted in only the M1 of the M frequency sub-band(s); the fourth information is used for determining a type of the M channel listening(s); the type of the M channel listening(s) is used for determining a mapping mode of the first modulation symbol sequence into the M frequency sub-band(s); the first node is a base station, the operating is transmitting; or the first node is a UE, the operating is receiving.

6. A method in a second node for wireless communication, comprising:
processing first information;
receiving a first radio signal in M1 of M frequency sub-band(s);
wherein the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the second node is a base station, the processing is transmitting; or the second node is a UE, the processing is receiving; the K bit block group(s) is(are) used for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

7. The method according to claim 6, comprising:
processing a first signaling;
wherein a first TB is used for generating the K bit block group(s), the first signaling is used for determining a size of the first TB; the second node is a base station, the processing is transmitting; or the second node is a UE, the processing is receiving;
the M1 is less than the M and the K1 is less than the K; a transmitter of the first radio signal transmits the first radio signal only in the M1 of the M frequency sub-bands; among the K bit block groups only the K1 bit block group(s) is(are) used for generating the first radio signal; the M1 is used for determining the K1; a position(s) of the M1 frequency sub-band(s) in the M frequency sub-bands is(are) used for determining the K1 bit block group(s) out of the K bit block groups; all bits comprised in the K bit block groups are used for generating B1 modulation symbols, the B1 modulation symbols are respectively mapped into B1 REs; among REs mapped by the B1 modulation symbols only REs mapped by B2 modulation symbols are located within the M1 frequency sub-band(s) in frequency domain; the K1 bit block group(s) is(are) bit block group(s) of the K bit block groups used for generating the B2 modulation symbols; the B2 is a positive integer, the B1 is a positive integer no less than the B2.

8. The method according to claim 6, comprising:
receiving a second radio signal;
wherein K2 of the K bit block group(s) is(are) used for generating the second radio signal, the K2 is a positive integer no greater than the K; the first radio signal and the second radio signal belong to a same HARQ process;
or, comprising:
processing third information;
wherein the third information is used for determining M0 frequency sub-band(s), any of the M frequency sub-band(s) is one of the M0 frequency sub-band(s); the M0 is a positive integer no less than the M; the second node is a base station, the processing is transmitting; or the second node is a UE, the processing is receiving;
or, comprising:
transmitting second information;
wherein the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

9. The method according to claim 6, wherein the first modulation symbol sequence is mapped into L layers of the M time-frequency resource set(s), the L is a positive integer greater than 1; a third modulation symbol and a fourth modulation symbol are any two modulation symbols in the first modulation symbol sequence mapped into different layers of a reference subcarrier within a reference multicarrier symbol occupied by a second reference time-frequency resource set; the second reference time-frequency resource set is any of the M time-frequency resource set(s), the reference multicarrier symbol is any multicarrier symbol within the second reference time-frequency resource set, the reference subcarrier is any subcarrier within the second reference time-frequency resource set; modulation symbols in the first modulation symbol sequence located between the third modulation symbol and the fourth modulation symbol are all mapped into the reference subcarrier within the reference multicarrier symbol occupied by the second reference time-frequency resource set; a seventh modulation symbol and an eighth modulation symbol are any two modulation symbols in the first modulation symbol sequence mapped into different subcarriers within the reference multicarrier symbol occupied by the second reference time-frequency resource set; modulation symbols in the first modulation symbol sequence located between the seventh modulation symbol and the eighth modulation symbol are all mapped into the reference multicarrier symbol occupied by the second reference time-frequency resource set.

10. The method according to claim 6, comprising:
processing fourth information;
wherein the fourth information is used for determining a type of M channel listening(s); the M channel listening(s) is(are) respectively applied to the M frequency sub-band(s), the M channel listening(s) is(are) used for determining that the first radio signal can be transmitted in only the M1 of the M frequency sub-band(s); the type of the M channel listening(s) is used for determining a mapping mode of the first modulation symbol sequence into the M frequency sub-band(s); the second node is a base station, the processing is transmitting; or the second node is a UE, the processing is receiving.

11. A device in a first node for wireless communication, comprising:
a first processor, operating first information; and
a first transmitter, transmitting a first radio signal in M1 of M frequency sub-band(s);
wherein the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the first node is a base station, the operating is transmitting; or the first node is a UE, the operating is receiving; the K bit block group(s) is(are) used for generating a first modulation symbol sequence, the first modulation symbol sequence is mapped into M time-frequency resource set(s), the M time-frequency resource set(s) belongs (belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set; the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

12. The device in the first node according to claim 11, wherein the first processor also operates a first signaling; herein, a first TB is used for generating the K bit block group(s), the first signaling is used for determining a size of the first TB; the first node is a base station, the operating action is transmitting; or the first node is a UE, the operating action is receiving;
the M1 is less than the M and the K1 is less than the K; the first node transmits the first radio signal only in the M1 of the M frequency sub-bands; among the K bit block groups only the K1 bit block group(s) is(are) used for generating the first radio signal; the M1 is used for determining the K1; a position(s) of the M1 frequency sub-band(s) in the M frequency sub-bands is(are) used for determining the K1 bit block group(s) out of the K bit block groups; all bits comprised in the K bit block groups are used for generating B1 modulation symbols, the B1 modulation symbols are respectively mapped into B1 REs; among REs mapped by the B1 modulation symbols only REs mapped by B2 modulation symbols are located within the M1 frequency sub-band(s) in frequency domain; the K1 bit block group(s) is(are) bit block group(s) of the K bit block groups used for generating the B2 modulation symbols; the B2 is a positive integer, the B1 is a positive integer no less than the B2.

13. The device in the first node according to claim 11, wherein the first transmitter also transmits a second radio signal; herein, K2 of the K bit block group(s) is(are) used for generating the second radio signal, the K2 is a positive integer no greater than the K; the first radio signal and the second radio signal belong to a same HARQ process;
or, the first processor also operates third information; wherein the third information is used for determining M0 frequency sub-band(s), any of the M frequency sub-band(s) is one of the M0 frequency sub-band(s); the M0 is a positive integer no less than the M; the first node is a base station, the operating action is transmitting; or the first node is a UE, the operating action is receiving;
or, the first processor also receives second information; wherein the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

14. The device in the first node according to claim 11, wherein the first modulation symbol sequence is mapped into L layers of the M time-frequency resource set(s), the L is a positive integer greater than 1; a third modulation symbol and a fourth modulation symbol are any two modulation symbols in the first modulation symbol sequence mapped into different layers of a reference subcarrier within a reference multicarrier symbol occupied by a second reference time-frequency resource set the second reference time-frequency resource set is any of the M time-frequency resource set(s), the reference multicarrier symbol is any multicarrier symbol within the second reference time-frequency resource set, the reference subcarrier is any subcarrier within the second reference time-frequency resource set; modulation symbols in the first modulation symbol sequence located between the third modulation symbol and the fourth modulation symbol are all mapped into the reference subcarrier within the reference multicarrier symbol occupied by the second reference time-frequency resource set; a seventh modulation symbol and an eighth modulation symbol are any two modulation symbols in the first modulation symbol sequence mapped into different subcarriers within the reference multicarrier symbol occupied by the second reference time-frequency resource set; modulation symbols in the first modulation symbol sequence located between the seventh modulation symbol and the eighth modulation symbol are all mapped into the reference multicarrier symbol occupied by the second reference time-frequency resource set.

15. The device in the first node according to claim 11, wherein the first processor also performs M channel listening(s) respectively in the M frequency sub-band(s); and operates fourth information; wherein the M channel listening(s) is(are) used for determining that the first radio signal can be transmitted in only the M1 of the M frequency sub-band(s); the fourth information is used for determining a type of the M channel listening(s); the type of the M channel listening(s) is used for determining a mapping mode of the first modulation symbol sequence into the M frequency sub-band(s); the first node is a base station, the operating action is transmitting; or the first node is a UE, the operating action is receiving.

16. A device in a second node for wireless communication, comprising:
a second processor, processing first information; and
a first receiver, receiving a first radio signal in M1 of M frequency sub-band(s);
wherein the first information is used for determining S candidate integers; K1 of K bit block group(s) is(are) used for generating the first radio signal, any of the K bit block group(s) comprises a positive integer number of code block(s); the K is one of S1 candidate integer(s), the M is used for determining the S1 candidate integer(s) out of the S candidate integers; the M, the K and the S are respectively positive integers; the M1, the K1 and the S1 are positive integers no greater than the M, the K and the S respectively; the second node is a base station, the processing is transmitting; or the second node is a UE, the processing is receiving; the K bit block group(s) is(are) used for generating a first modulation symbol sequence, the first modulation symbol sequence is mapped into M time-frequency resource set(s), the M time-frequency resource set(s) belongs(belong) to the M frequency sub-band(s) respectively in frequency domain; a first modulation symbol and a second modulation symbol are any two modulation symbols in the first modulation symbol sequence mapped into a target time-frequency resource set of the M time-frequency resource set(s); any modulation symbol of the first modulation symbol sequence located between the first modulation symbol and the second modulation symbol is mapped into the target time-frequency resource set the first modulation symbol sequence comprises M sub-sequence(s), the M sub-sequence(s) is(are) respectively mapped into the M time-frequency resource set(s); the K bit block group(s) is(are) divided into M bit block group set(s), any of the M bit block group set(s) comprises a positive integer number of bit block group(s) out of the K bit block group(s); the M bit block group set(s) is(are) respectively used for generating the M sub-sequence(s).

17. The device in the second node according to claim 16, wherein the second processor processes a first signaling; herein, a first TB is used for generating the K bit block group(s), the first signaling is used for determining a size of the first TB; the second node is a base station, the processing action is transmitting; or the second node is a UE, the processing action is receiving;
the M1 is less than the M and the K1 is less than the K; a transmitter of the first radio signal transmits the first radio signal only in the M1 of the M frequency sub-bands; among the K bit block groups only the K1 bit block group(s) is(are) used for generating the first radio signal; the M1 is used for determining the K1; a position(s) of the M1 frequency sub-band(s) in the M frequency sub-bands is(are) used for determining the K1 bit block group(s) out of the K bit block groups; all bits comprised in the K bit block groups are used for generating B1 modulation symbols, the B1 modulation symbols are respectively mapped into B1 REs; among REs mapped by the B1 modulation symbols only REs mapped by B2 modulation symbols are located within the M1 frequency sub-band(s) in frequency domain; the K1 bit block group(s) is(are) bit block group(s) of the K bit block groups used for generating the B2 modulation symbols; the B2 is a positive integer, the B1 is a positive integer no less than the B2.

18. The device in the second node according to claim 16, wherein the first receiver receives a second radio signal; herein, K2 of the K bit block group(s) is(are) used for generating the second radio signal, the K2 is a positive integer no greater than the K; the first radio signal and the second radio signal belong to a same HARQ process;
or, the second processor also processes third information; wherein the third information is used for determining M0 frequency sub-band(s), any of the M frequency sub-band(s) is one of the M0 frequency sub-band(s); the M0 is a positive integer no less than the M; the second node is a base station, the processing action is transmitting; or the second node is a UE, the processing action is receiving;
or, the second processor transmits second information; wherein the second information is used for determining whether each of the K bit block group(s) is correctly received; a reference bit block group is any of the K bit block group(s); the second information is used for determining that any code block comprised in the reference bit block group is correctly received, or the second information is used for determining that a code block comprised in the reference bit block group is not correctly received.

19. The device in the second node according to claim 16, wherein the first modulation symbol sequence is mapped into L layers of the M time-frequency resource set(s), the L is a positive integer greater than 1, a third modulation symbol and a fourth modulation symbol are any two modulation symbols in the first modulation symbol sequence mapped into different layers of a reference subcarrier within a reference multicarrier symbol occupied by a second reference time-frequency resource set; the second reference time-frequency resource set is any of the M time-frequency resource set(s), the reference multicarrier symbol is any multicarrier symbol within the second reference time-frequency resource set, the reference subcarrier is any subcarrier within the second reference time-frequency resource set; modulation symbols in the first modulation symbol sequence located between the third modulation symbol and the fourth modulation symbol are all mapped into the reference subcarrier within the reference multicarrier symbol occupied by the second reference time-frequency resource set; a seventh modulation symbol and an eighth modulation symbol are any two modulation symbols in the first modulation symbol sequence mapped into different subcarriers within the reference multicarrier symbol occupied by the second reference time-frequency resource set; modulation symbols in the first modulation symbol sequence located between the seventh modulation symbol and the eighth modulation symbol are all mapped into the reference multicarrier symbol occupied by the second reference time-frequency resource set.

20. The device in the second node according to claim 16, wherein the second processor processes fourth information; wherein the fourth information is used for determining a type of M channel listening(s); the M channel listening(s) is(are) respectively applied to the M frequency sub-band(s), the M channel listening(s) is(are) used for determining that the first radio signal can be transmitted in only the M1 of the M frequency sub-band(s); the type of the M channel listening(s) is used for determining a mapping mode of the first modulation symbol sequence into the M frequency sub-band(s); the second node is a base station, the processing action is transmitting; or the second node is a UE, the processing action is receiving.

\* \* \* \* \*